United States Patent [19] Best Available Copy [11] E Re. 28,539

Scott [45] Reissued Sept. 2, 1975

[54] RELAY VALVE WITH LOAD SENSING MEANS

[75] Inventor: Daniel G. Scott, Forest Hills, Pa.

[73] Assignee: Westinghouse Air Brake Company, Wilmerding, Pa.

[22] Filed: Oct. 9, 1973

[21] Appl. No.: 404,133

Related U.S. Patent Documents

Reissue of:

[64] Patent No.: 3,612,621
Issued: Oct. 12, 1971
Appl. No.: 11,812
Filed: Feb. 16, 1970

[52] U.S. Cl. ..... 303/22 R; 303/36
[51] Int. Cl. ..... B60t 8/18
[58] Field of Search ..... 303/22 R, 22 A, 23, 6 C, 303/40, 36, 60; 188/195

[56] References Cited

UNITED STATES PATENTS

| | | | |
|---|---|---|---|
| 1,720,284 | 7/1929 | Maliphant | 303/22 R |
| 1,935,809 | 11/1933 | McCune | 303/23 R |
| 3,018,138 | 1/1962 | Wilson et al. | 303/36 |
| 3,018,139 | 1/1962 | Stelzer | 303/22 A |
| 3,147,044 | 9/1964 | Glass | 303/22 A |
| 3,193,333 | 7/1965 | Weber | 303/23 R |
| 3,300,255 | 1/1967 | Racki | 303/36 |
| 3,341,257 | 9/1967 | Weber | 303/22 R |
| 3,376,080 | 4/1968 | Kettering et al. | 303/22 R |

*Primary Examiner*—Trygve M. Blix
*Assistant Examiner*—D. C. Butler
*Attorney, Agent, or Firm*—W. F. Poore; R. W. McIntire, Jr.

[57] ABSTRACT

[This invention relates to a] *A* railway vehicle double abutment relay valve device for interposition between a brake control pipe and a brake cylinder and includes a novel mechanism adjustable accordingly as the vehicle is empty or loaded to so condition the relay valve device that its operation by fluid under pressure from the brake control pipe always provides a supply of fluid under pressure to the brake cylinder, the value of which is in accordance with the weight of the load carried by a spring-supported (or sprung) part of the vehicle between which and an unsprung part, the relay valve device is interposed for effecting operation of the novel load-measuring or sensing mechanism thereof in accordance with changes in the load carried by the spring-supported part. The novel load-sensing mechanism includes a fluid pressure operated spool-type valve operatively connected to a load-sensing arm movable to one or another position accordingly as the vehicle is empty or loaded. The spool-type valve is provided with a pair of longitudinally spaced-apart elongated peripheral annular grooves one of which carries therein a reciprocable or sliding O-ring seal that so serves as a valve to control flow of fluid under pressure to one side of one of the abutments of the relay valve device as to accommodate substantial arcuate movement of the load-measuring arm without effecting a change-over of the relay valve device from load operation to empty operation and vice versa. The lengths and locations of these elongated grooves are such as to require that the movement of the spool valve in either direction, in response to the shocks, jolts, vertical movement and sidewise rocking experienced by the body of a railway vehicle while traveling at high speed, exceeds a chosen percentage of the total valve movement between empty and loaded positions before the O-ring seal is shifted from one end of its groove to another to thereby effect a change in the control of flow of fluid under pressure through a communication to one side of one of the abutments of the relay valve device to thereby render the one abutment effective or ineffective to cooperate with the other abutment to control operation of the relay valve device in accordance with the difference in the effective area of the pair of abutments, or in accordance with the effective area of the larger of the abutments.

15 Claims, 4 Drawing Figures

2 Sheets-Sheet 1

INVENTOR.
DANIEL G. SCOTT
BY Ralph W. McIntire, Jr.
ATTORNEY

INVENTOR.
DANIEL G. SCOTT
BY Ralph W. McIntire, Jr.
ATTORNEY

RELAY VALVE WITH LOAD SENSING MEANS

Matter enclosed in heavy brackets [ ] appears in the original patent but forms no part of this reissue specification; matter printed in italics indicates the additions made by reissue.

BACKGROUND OF THE INVENTION

In [the copending application Ser. No. 888,583 filed Dec. 29, 1969 of] *U.S. Pat. No. 3,606,485 issued Sept. 20, 1971 to* Daniel G. Scott, there is shown and described a railway vehicle relay valve device that includes a mechanism adjustable accordingly as the vehicle is empty or loaded to so condition the relay valve device that its operation by fluid under pressure from the brake control pipe provides a supply of fluid pressure to the brake cylinder, the value of which pressure is in accordance with the weight of the load carried by a spring-supported part of the vehicle between which and an unsprung part, the relay valve device is interposed for effecting operation of the load-sensing mechanism thereof in accordance with changes in the load carried by the spring supported part. Such presently known empty and load load-sensing mechanisms, which are continuously operable while a brake application is in effect, provide a single, common change-over point when changing the load on the vehicle from full load to empty and vice versa. In other words, the maximum travel of a load-sensing element in shifting from its empty position to its full-load position, and vice versa, necessarily corresponds to one half the total deflection of the vehicle truck springs. However, should the vehicle be partly loaded, the load-sensing element of the load-sensing mechanism may be subject to sufficient movement, in response to the shocks, jolts, vertical movement and sidewise rocking experienced by the body of a railway vehicle while traveling at high speed, to effect a change in the operation of the relay valve device so that it provides a maximum brake cylinder pressure when a minimum pressure is desired, and vice versa.

Accordingly, it is the general purpose of this invention to provide a simple and inexpensive differential type of fluid-pressure-operated relay valve device that includes a novel load-sensing mechanism in the form of a fluid pressure operated spool-type valve that is operatively connected to a load-sensing arm and is provided with a pair of spaced-apart elongated peripheral annular grooves one of which carries therein a sliding O-ring seal which serves as a change-over valve. The longitudinal lengths of these two grooves and their location along the length of the spool-type valve are so selected as to provide that this valve may be moved a greater distance from either its empty position or its full load position than heretofore possible, in response to the rocking of the load-sensing arm effected by the shocks, jolts, vertical movement and sidewise rocking of a railway vehicle body while the vehicle is traveling at a high speed, without causing shifting of the O-ring seal from one end of its groove to the other to thereby cause the supply of fluid under pressure to or the release of fluid under pressure from one side of one of a pair of abutments of the relay valve device to render the one abutment effective or ineffective to cooperate with the other abutment to control operation of the relay valve device in accordance with the difference in the effective area of the pair of abutments or in accordance with the effective area of the larger of the abutments.

SUMMARY OF THE INVENTION

According to the present invention, there is provided a double-diaphragm relay valve device for use on railway vehicles that are normally operated either empty or fully loaded. This relay valve device is mounted on a sprung part of the vehicle and includes a novel load-sensing mechanism that has a spool-type valve connected at one end to one side of an operating piston subject on its opposite side to fluid under pressure supplied from the brake cylinder port of a brake control valve and connected at its opposite end via a link or a slot to a pivoted load-sensing arm one end of which is rockable into contact with an unsprung part of the vehicle to thereby position the spool valve in a first position while the vehicle is empty and in a second position while it is loaded. The spool valve is provided with two longitudinal spaced-apart elongated peripheral annular grooves one of which carries a sliding O-ring seal which serves as a valve to control flow of fluid under pressure to one side of one of the abutments of the relay device. The length and location of these grooves are so selected as to accommodate a chosen amount of rocking of the load-sensing arm and corresponding movement of the spool valve, which is greater than that heretofore possible, without effecting either the supply of fluid under pressure to or the release of fluid under pressure from one side of one of the diaphragms of the double-diaphragm relay valve device to thereby render the one diaphragm either effective or ineffective to cooperate with the other diaphragm to control operation of the relay valve device in accordance with the difference in the effective area of the two diaphragms, or in accordance with the effective area of the other diaphragm.

In the accompanying drawings:

FIG. 1 is a diagrammatic view, in outline, showing an empty and load railway vehicle brake equipment constructed in accordance with one embodiment of the invention, the relay valve device included in this equipment being shown in cross-section and embodying therein a novel load-sensing mechanism.

FIG. 2 is a diagrammatic view, in outline, showing an empty and load railway vehicle brake equipment constructed in accordance with a second embodiment of the invention, the relay valve device included in this equipment being shown in cross-section and differing in construction from that of the relay valve device shown in FIG. 1, this relay valve device embodying therein a second novel load-sensing mechanism that includes a spool-type valve.

Figure 1:
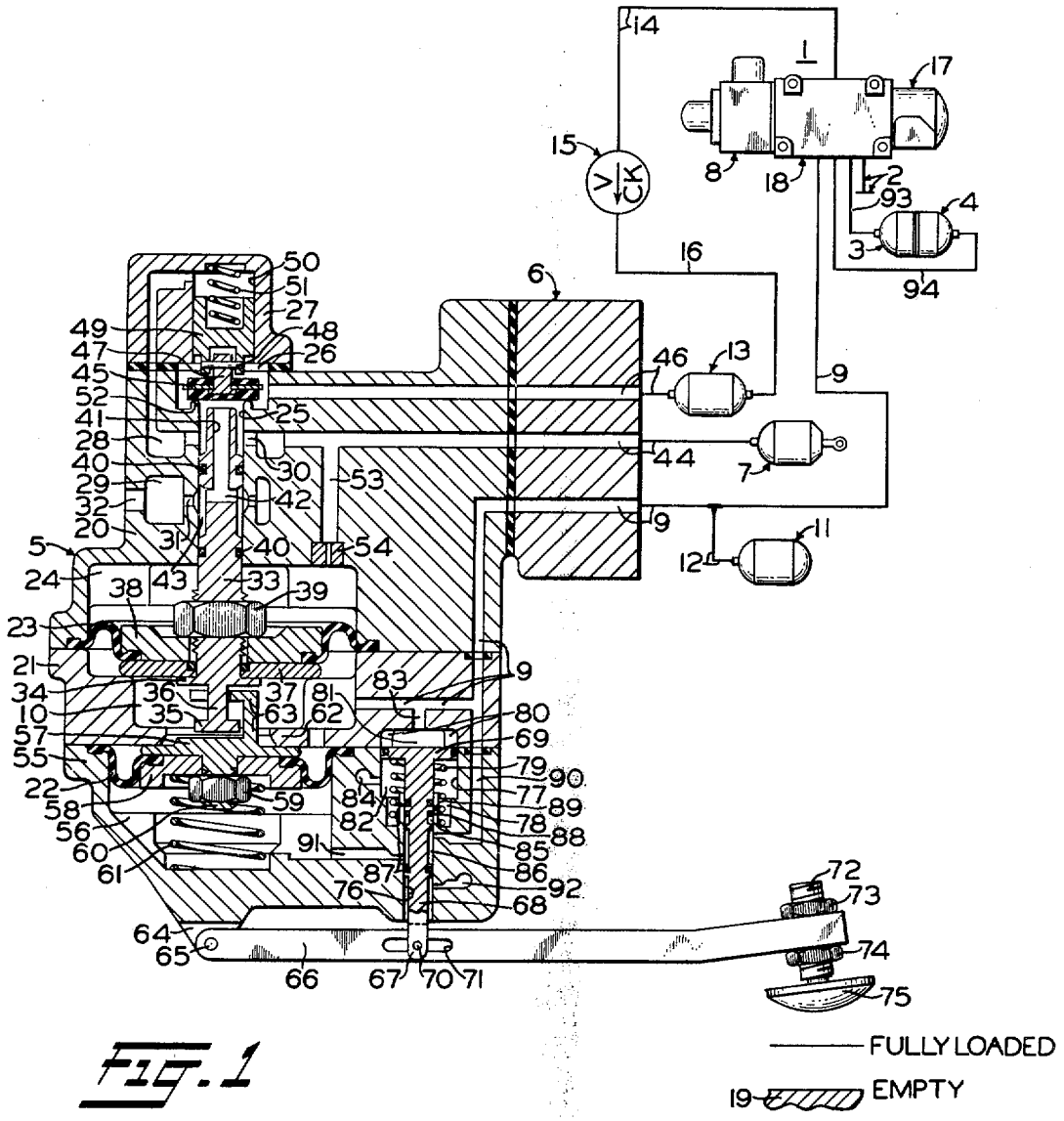

In FIG. 1 of the drawings, there is shown an empty and load fluid pressure brake equipment constructed in accordance with a first embodiment of the invention, it being understood that this brake equipment is suitable primarily for use on railway vehicles that are always operated while either empty or loaded to their maximum load-carrying capacity.

The empty and load fluid pressure brake equipment shown in FIG. 1 comprises a brake control valve 1 to which is connected the usual brake pipe 2, auxiliary reservoir 3, and emergency reservoir 4. The empty and load brake equipment shown in FIG. 1 further includes a double-diaphragm differential-type self-lapping relay valve device 5 having a pipe bracket 6 that is mounted by any suitable means (not shown) on a sprung part (not shown) of a railway vehicle, and a brake cylinder 7.

The brake control valve device 1 shown in FIG. 1 of the drawings is of the AB type which may be of substantially the same operating characteristics as the brake control valve device fully described in U.S. Pat. No. 2,031,213, issued Feb. 18, 1936 to Clyde C. Farmer, and assigned to the assignee of the present invention, in view of which it is deemed unnecessary to show and describe this valve device in detail.

Briefly, however, the brake control valve device 1 comprises a service portion 8 adapted to operate upon both a service and an emergency rate of reduction in pressure of fluid in brake pipe 2 for supplying fluid under pressure from the auxiliary reservoir 3 to a brake cylinder pipe 9 which is connected by a correspondingly numbered passageway to a control chamber 10 in the relay valve device 5. A volume reservoir 11 is connected to the pipe 9 by a pipe 12 the purpose of this reservoir 11 being to provide the proper equalization pressure between the auxiliary reservoir 3 and the control chamber 10 in the relay valve device 5 when a brake application is effected.

The relay valve device 5 is operated by the fluid under pressure supplied to the control chamber 10, upon a service rate of reduction in brake pipe pressure, to effect the supply of fluid under pressure from a supply reservoir 13 to the brake cylinder 7 in a manner hereinafter described in detail, for effecting a service application of the brakes on the vehicle. It will be understood that the supply reservoir 13 is charged from the brake pipe 2 via the brake control valve 1, a pipe 14 connected to the inlet of a one-way flow check valve device 15, and a pipe 16 having one end connected to the outlet of the check valve device 15 and the other end connected to the supply reservoir 13.

The brake control valve device 1 also comprises an emergency portion 17 which is adapted to operate only upon an emergency rate of reduction in pressure of fluid in brake pipe 2 for supplying fluid under pressure from the emergency reservoir 4 to the pipe and passageway 9 and chamber 10. This fluid under pressure thus supplied from the emergency reservoir 4 to the pipe and passageway 9 and chamber 10, in addition to that provided in this pipe and passageway and chamber from the auxiliary reservoir 3 by operation of the service portion 8, is adapted to operate the relay valve 5 to provide a higher pressure in the brake cylinder device 7 to cause an emergency application of the brakes on the vehicle. Upon recharging the brake pipe 2, the brake control valve 1 is adapted to operate to open the pipe and passageway 9 to atmosphere for releasing fluid under pressure therefrom and also from the volume reservoir 11 and chamber 10 to cause the relay valve device 5 to operate to release fluid under pressure from the brake cylinder 7 to atmosphere thereby releasing the brakes on the vehicle and at the same time to effect the recharging of the auxiliary reservoir 3, the emergency reservoir 4 and the supply reservoir 13 in the usual well-known manner. The service and emergency portions 8 and 17, respectively, of the brake control valve 1 are mounted on the opposite faces of a pipe bracket 18 to which all pipe connections to the brake control valve 1 are made, as shown in FIG. 1 of the drawings.

It will be understood that all of the above-mentioned parts of the brake equipment are mounted on a suitable sprung part of the vehicle which sprung part is movable vertically relative to a stop 19 carried on an unsprung part of a railway vehicle which unsprung part may be, for example, a side frame of the vehicle truck.

The double-diaphragm self-lapping relay valve device 5 comprises, as shown in FIG. 1, a sectionalized casing embodying two casing sections 20 and 21 and two coaxially arranged movable abutments or diaphragms 22 and 23 of different effective areas. The outer periphery of the larger diaphragm 23 is clamped between the casing sections 20 and 21 which are secured together by any suitable means (not shown).

The diaphragm 23 cooperates with the casing sections 20 and 21 and the diaphragm 22 to form within the relay valve device 5 and on the opposite sides of the diaphragm 23, a chamber 24 and the hereinbefore-mentioned chamber 10.

The casing section 20 of the above-mentioned sectionalized casing of the relay valve device 5 is provided with a bore 25 that at its upper end opens into a chamber 26 formed by the cooperative relationship between the upper end of the casing section 20 and a cover member 27 secured to the casing section 20 by any suitable means (not shown). The opposite or lower end of the bore 25 opens into the chamber 24, and intermediate its ends this bore 25 opens respectively into two spaced-apart annular chambers 28 and 29 formed in the casing section 20 via two sets of arcuately spaced ports 30 and 31. The chamber 29 is open to atmosphere via a short passageway 32. Slidably mounted in the bore 25 is a valve stem 33 having adjacent its lower end a pair of spaced-apart collars 34 and 35 between which is a portion 36 of reduced diameter.

Above the collar 34 is a screw-threaded portion of reduced diameter which extends through an annular diaphragm follower 37 and a diaphragm follower plate 38 and receives in screw-threaded engagement therewith a nut 39 whereby the inner peripheral edge of the diaphragm 23 is clamped between the diaphragm follower 37 and diaphragm follower plate 38 to operatively connect valve stem 33 to this diaphragm 23.

Above the nut 39 thereon the stem 33 is provided with two identical spaced-apart peripheral annular grooves in each of which is disposed an O-ring seal 40 that forms a seal with the wall surface of the bore 25 to prevent leakage of fluid under pressure between the periphery of the valve stem 33 and the wall of the bore 25, and from the chambers 24 and 28 to the atmospheric chamber 29.

The valve stem 33 is provided with a bottomed bore 41 and a cross-bore 42 the opposite ends of which open onto an elongated peripheral annular groove 43 formed on the stem 33 intermediate the two O-ring seals 40 carried thereby. The groove 43 is so located that while the stem 33 occupies the position shown in FIG. 1 the pressure chamber in the brake cylinder 7 is open to atmosphere via a pipe and corresponding passageway 44, chamber 28, ports 30 formed in casing section 20, bore 25, bottomed bore 41, cross-bore 42, groove 43, the ports 31 formed in the casing section 20 and connecting the interior of the bore 25 to chamber 29, chamber 29 and the short passageway 32.

A flat disc-type valve 45 is disposed in the chamber 26 which is supplied with fluid under pressure from the supply reservoir 13 via a pipe and corresponding passageway 46. The valve 45 is provided with a stem 47 through which extends a pin 48 the opposite ends of which are anchored in the jaws of a clevis formed integral with a valve guide member 49 that is slidably mounted in a bottomed bore 50 provided in the cover member 27.

Interposed between the cover member 27 and the valve guide member 49 is a spring 51 which is effective via the pin 48 and stem 47 to normally bias the valve 45 against an annular valve seat 52 formed at the upper end of the bore 25 to normally close communication between the chamber 26 and the interior of the bore 25 except when the valve 45 is unseated in a manner hereinafter described. This valve 45 thus controls communication between the chamber 26 to which the supply reservoir 13 is connected via pipe and passageway 46 and the interior of the bore 25 from which fluid under pressure may flow to the brake cylinder 7 via ports 30, chamber 28, and passageway and pipe 44.

The above-mentioned passageway 44 is connected to the chamber 24 above the diaphragm 23 by a passageway 53 provided in the casing section 20 and a choke 54 disposed in this passageway.

The outer periphery of the smaller diaphragm 22 is clamped between the casing section 21 and a bottom cover member 55 which is secured to the casing section 21 by any suitable means (not shown) and which cooperates with the diaphragm 22 to form a chamber 56.

The inner periphery of the smaller diaphragm 22 is clamped between a diaphragm follower 57 and an annular diaphragm follower plate 58 by a nut 59 that has screw-threaded engagement with a screw-threaded stem 60 formed integral with and extending from the lower side of the diaphragm follower 57 through the annular diaphragm follower plate 58.

A spring 61 disposed in the chamber 56 in surrounding relation to the stem 60 is interposed between the bottom cover member 55 and the diaphragm follower plate 58 for normally biasing the diaphragm follower 57 against a stop 62 formed integral with the casing section 21.

A lost-motion connection is provided between the diaphragms 22 and 23 by a forked portion or member 63 that is formed integral with and extends from the upper side of the diaphragm follower 57 so as to straddle the portion 36 of reduced diameter that connects the collars 34 and 35.

Formed integral with and extending downward from the bottom of the bottom cover member 55 at the left-hand end thereof are the parallel spaced-apart jaws of a clevis 64 only one of which jaws appears in FIG. 1. Rockably mounted on a pin 65 that has its opposite ends anchored in the jaws of this clevis 64 is one end of a load-sensing lever 66.

The lever 66 extends between the jaws of a clevis 67 that is formed at the lower end of a piston rod 68 that at its upper end is integral with a piston 69 and is operatively connected to this piston rod 68 by a pin 70 that extends through an elongated slot 71 provided in the lever 66 and has its opposite ends anchored in the jaws of the clevis 67.

Adjacent its right-hand end, the lever 66 is provided with a screw-threaded bore (not shown) which receives a screw-threaded stem 72 that carries two lock nuts 73 and 74 that provide for adjusting the stem 72 with respect to the lever 66 and then locking this stem in this adjusted position. By adjusting the position of the stem 72, the lower end of which is provided with a foot 75 that is rockable, in a manner hereinafter explained, into abutting relationship with the stop 19 carried by the unsprung truck side frame, the empty and load brake apparatus constituting the present invention can be adapted for use on railway vehicles having different total spring deflections.

The bottom cover member 55, as shown in FIG. 1, is provided with a bore 76, a coaxial counterbore 77 and a recess 78 formed, as by machining, to constitute a spring seat for one end of a spring 79 that is disposed in surrounding relation to the piston rod 68 which extends through the bore 76 and is interposed between this spring seat and the piston 69 that is slidably mounted in the counterbore 77. This spring 79 normally biases the piston 69, piston rod 68 and load-sensing lever 66 to the position shown in FIG. 1 in which the piston 69 abuts a pair of stops 80 formed integral with the casing section 21.

The piston 69 cooperates with the casing section 21 and the bottom cover member 55 to form on the respective opposite sides of this piston a pair of chambers 81 and 82. The chamber 81 is connected to the hereinbefore-mentioned passageway 9 in the casing section 21 by a short passageway 83, and the chamber 82 is constantly open to atmosphere via a passageway 84 provided in the bottom cover member 55.

As shown in FIG. 1 of the drawings, the piston rod 68 has two spaced elongated peripheral annular grooves 85 and 86 and carries in two spaced-apart peripheral annular grooves thereon two O-ring seals 87 for preventing leakage along the bore 76. The upper O-ring seal 87 is interposed between the chamber 82 and the elongated peripheral annular groove 85, and the lower O-ring seal 87 is disposed below the lower end of the elongated peripheral annular groove 86. Another O-ring seal 88 is reciprocable within and relative to the groove 85 so as to serve as a valve in the manner hereinafter explained.

While the piston 69 and piston rod 68 occupy the position shown in FIG. 1 of the drawing, a port 89 provided in the bottom cover member 55 opens at one end at the wall surface of the bore 76 just below the upper O-ring seal 87 and above the upper end of the elongated peripheral annular groove 85 and at the opposite end into the recess 78. Therefore, the upper end of the groove 85 is open to atmosphere via the port 89, recess 78, chamber 82 and passageway 84.

Also, while the piston 69 and piston rod 68 occupy the position shown in FIG. 1, the elongated peripheral annular groove 86 thereon establishes a communication between a passageway 90 that at one end opens at the wall surface of the bore 76 just below the upper end of this groove 86 and at the other end opens into the hereinbefore-mentioned passageway 9, and a passageway 91 that at one end opens at the wall surface of the bore 76 just above the lower O-ring seal 87 and at the other end opens into the chamber 56 below the diaphragm 22.

Furthermore, it will be noted that, while the piston 69 and piston rod 68 occupy the position shown in FIG. 1, the lower O-ring seal 87 carried by the piston rod 68 closes communication between the passageway 91 and an atmospheric passageway 92 that at one end opens at the wall surface of the bore 76 below this lower O-ring seal 87 and at the other end opens at the exterior surface of the bottom cover member 55.

Consequently, when fluid under pressure is supplied to the passageways 9 and 90 in a manner hereinafter-described while the piston 69 and piston rod 68 occupy the position shown in FIG. 1, the O-ring seal 88 will be moved by this fluid under pressure to the upper end of the groove 85.

It will be noted that fluid under pressure supplied to the passageways 9 and 90 also flows to the chamber 81 via the passageway 83 to effect downward movement of the piston 69 which is effective via the piston rod 68 to rock the load-sensing lever 66 clockwise about the pin 65 until the foot 75 abuts the stop 19. Accordingly, it will be apparent that, with the railway vehicle fully loaded and O-ring seal 88 now at the upper end of the groove 85, a greater amount of further clockwise rocking of the lever 66 about the pin 65 and corresponding movement of the piston rod 68 can be effected in response to the shocks, jolts, vertical movement and sidewise rocking experienced by the body of a railway vehicle while traveling at high speed without closing communication between passageways 90 and 91 than would be the case if the O-ring seal 88 were not at the upper end of the groove 85 at this time.

It will be further apparent that while the vehicle is empty, the fluid under pressure supplied to the chamber 81 will effect downward movement of the piston 69 and piston rod 68 until the foot 75 abuts the stop 19 and that while the piston rod 68 occupies this position, the groove 85 is in such a position that any fluid under pressure subsequently supplied to the passageways 9 and 90 is effective to move the O-ring seal 88 to the lower end of the groove 85 so that communication is closed between passageways 90 and 91. Consequently, while the railway vehicle is empty and the O-ring seal 88 is at the lower end of the groove 85, a greater amount of counterclockwise rocking of the lever 66 about the pin 65 and corresponding movement of the piston rod 68 can be effected in response to the shocks, jolts, etc., experienced by the body of the railway vehicle while traveling at high speed without re-establishing communication between the passageways 90 and 91 than would be the case if the O-ring seal 88 were not now at the lower end of the groove 85.

OPERATION — FIG. 1

Initial Charging

In initial charging the empty and load brake equipment shown in FIG. 1 of the drawings, fluid under pressure supplied to the brake pipe 2 by the usual brake valve (not shown) on the locomotive flows to the brake control valve device 1 and thence through this device and a pipe 93 connected to the auxiliary reservoir 3 and a pipe 94 connected to the emergency reservoir 4, respectively, to effect charging of these reservoirs in the usual well-known manner. Fluid under pressure will also flow from the brake pipe 2 through the brake control valve device 1, pipe 14, check valve 15 and pipe 16 to the supply reservoir 13 to effect charging of this reservoir *and the chamber 26 via the pipe and passageway 46* to substantially the normal fully charged pressure carried in the brake pipe 2.

It will be understood that at this time the brake cylinder 7 and the various *other* chambers in the relay valve device 5 are devoid of fluid under pressure.

SERVICE APPLICATION OF THE BRAKES ON AN EMPTY VEHICLE

When it is desired to effect a service application of the brakes, the pressure in the brake pipe 2 will be reduced in the usual manner by operation of the brake valve on the locomotive to cause the brake control valve 1 to effect the supply of fluid under pressure from the auxiliary reservoir 3 to the pipe 9 which is connected by the correspondingly numbered passageway to the chamber 10 in the relay valve device 5. Since the pipe 9 is connected to the volume reservoir 11 by the pipe 12 and the passageway 9 is connected to the chamber 81 above the piston 69 by the passageway 83, fluid under pressure will flow from the auxiliary reservoir 3 simultaneously to the chambers 10 and 81 and the volume reservoir 11 which insures the same equalization of pressure between the auxiliary reservoir 3 and these chambers and volume reservoir 11 as would be obtained if the pipe 9 were connected to a standard or conventional brake cylinder.

It will be noted that at this time the upper end of the groove 85 is open to atmosphere via port 89, recess 78, chamber 82 and passageway 84. Therefore, it is apparent that some of the fluid under pressure supplied to the passageway 9 will flow therefrom to the interior of the bore 76 via the passageway 90. Accordingly, it is apparent that this fluid under pressure is effective to move the O-ring seal 88 to the upper end of the groove 85 if this O-ring seal is not already in this position.

The fluid under pressure supplied to the chamber 81 in the manner described above acts on the upper face of the piston 69 to move this piston and the piston rod 68 downward against the yielding resistance of the spring 79. This downward movement of the piston rod 68 is effective via the clevis 67 and pin 70 to rock the lever 66 clockwise about the pin 65. Since the vehicle may be assumed to be empty, the foot 75 is at a maximum distance from the stop 19. Therefore, piston 69 and piston rod 68 will move downward until the foot 75 is moved into abutting relationship with the stop 19. As the piston rod 68 is thus moved downward, the O-ring seal 88, which is at the upper end of the groove 85, is moved past the location at which the lower end of the passageway 90 opens at the wall surface of the bore 76. Accordingly, as soon as the O-ring seal 88 is moved past the location at which the lower end of the passageway 90 opens at the wall surface of the bore 76, the fluid under pressure present in this passageway 90 is rendered effective to move the O-ring seal 88 from the upper end of the groove 85 to the lower end of this groove.

It should be noted that while in the position to which the piston 69 and piston rod 68 are moved, upon the foot 75 abutting the stop 19 while the vehicle is empty, the O-ring seal 88 is at the lower end of the groove 85 and forms a seal with the wall surface of the bore 76 at a location that is below the location at which the lower end of the passageway 90 opens at the wall surface of the bore 76 and above the location at which the right-hand end of the passageway 91 opens at the wall surface of this bore 76. Consequently, at this time the O-ring seal 88 closes communication between the passageways 90 and 91 to prevent the flow of fluid under pressure from the passageway 90 to the chamber 56 below the diaphragm 22.

It should be further noted that, while the piston rod 68 occupies the position described above, the upper O-ring seal 87 carried by the piston rod 68 forms a seal with the wall surface of the bore 76 at a location which is above the location at which the passageway 90 opens at the wall surface of the bore 76 and below the location at which the port 89 opens at the wall surface of this bore 76. Consequently, the upper O-ring seal 87 carried by the piston rod 67 prevents flow of fluid under pressure from the passageway 90 to atmosphere via the interior of the bore 76, port 89, recess 78, chamber 82 and passageway 84.

Moreover, it will be noted that, while the piston rod 68 occupies the position described above, the lower O-ring seal 87 carried by this piston rod forms a seal with the wall surface of the bore 76 at a location which is below the location at which the left-hand end of the atmospheric passageway 92 opens at the wall surface of the bore 76. Therefore, the chamber 56 is open to atmosphere via the passageway 91, groove 86 on the piston rod 68 and the passageway 92. Accordingly, only atmospheric pressure is present in the chamber 56 at this time.

The fluid under pressure supplied to the chamber 10 in the relay valve device 5 in the manner described above will act downward on the effective area of the smaller diaphragm 22 to deflect it in a downward direction and move the diaphragm follower 57 and forked member 63 downward until the forked member abuts collar 35.

With the forked member 63 in abutting relationship with the collar 35, a rigid connection is provided between the larger diaphragm 23 and the smaller diaphragm 22. Accordingly, it is apparent that the fluid under pressure supplied to the chamber 10 in the manner described above now acts in a downward direction on the effective area of the smaller diaphragm 22 and in an upward direction on the effective area of the larger diaphragm 23. Consequently, the fluid under pressure in the chamber 10 acts in an upward direction on an area equal to the difference in the effective areas of the diaphragms 23 and 22 to provide a force that moves the diaphragm stack comprising the diaphragms 22 and 23 and the valve stem 33 upward to first move the upper end of the valve stem 33 into contact with the lower side of valve 45 to close communication between the pressure chamber (not shown) in the brake cylinder device 7 and atmosphere. As the diaphragms 23 and 22 and stem 33 continue to be deflected upward, subsequent to movement of the upper end of the valve stem 33 into contact with the lower side of the valve 45, this valve will be moved upward away from the valve seat 52 against the yielding resistance of the spring 51.

Upon the unseating of valve 45 from the valve seat 52, fluid under pressure will flow from the supply reservoir 13 to the pressure in the brake cylinder [6] 7 shown in FIG. 1 via pipe and passageway 46, chamber 26, past unseated valve 45, bore 25, ports 30, chamber 28, and passageway and corresponding pipe 44.

Some of the fluid under pressure supplied to passageway 44 in the manner described above flows to the chamber 24 above the larger diaphragm 23 via the passageway 53 and the choke 54. The fluid under pressure thus applied to the chamber 24 acts on the effective area of the larger diaphragm 23 in a direction opposite to the direction that the fluid under pressure supplied to the chamber 10 acts on an area equal to the difference in the effective areas of the diaphragms 23 and 22 so that when the oppositely acting fluid pressure forces are substantially balanced, the spring 51 will be rendered effective to move the valve 45, stem 33 and diaphragm 23 downward to seat valve 45 on seat 52 to cut off flow of fluid under pressure from the supply reservoir 13 to the brake cylinder 7, it being understood that as the diaphragm 23 is thus deflected downward, the fluid under pressure present in the chamber 10 is rendered effective to deflect the diaphragm 22 downward and thereby maintain the forked member 63 in abutting relationship with the collar 35 thus maintaining the rigid connection between the diaphragm 23 and 22. From the foregoing, it is apparent, that, since the effective area of the larger diaphragm 23 subject to the pressure of fluid in the chamber 24 is greater than the difference in the effective areas of the diaphragms 23 and 22 subject to the pressure in the chamber 10, the pressure supplied to the pressure chamber in the brake cylinder 7 and to the chamber 24 is less than the pressure supplied to the chamber 10 and in inverse ratio to the effective areas of the larger diaphragm 23 and the smaller diaphragm 22. It will be understood, however, that this pressure in the pressure chamber of the brake cylinder 7 provides an adequate braking force for an empty vehicle.

While the brakes are applied on an empty vehicle, as has been stated above, the O-ring seal 88 is at the lower end of the groove 85 and forms a seal with the wall surface of the bore 76 at a location that is below the location at which the lower end of the passageway 90 opens at the wall surface of the bore 76 and above the location at which the right-hand end of the passageway 91 opens at the wall surface of this bore 76.

Furthermore, while the brakes are applied the foot 75 is in abutting relationship with the stop 19, as aforestated.

Accordingly, should any relative movement between the sprung and unsprung parts of the railway vehicle now occur as the result of shocks, jolts, vertical movement or sidewise rocking of the sprung part, that is the vehicle body, while the train is traveling at high speed, it is apparent that the lever 66 will be rocked clockwise about the pin 65 by the fluid under pressure present in the chamber 81 should this movement be such as to increase the distance between the sprung and unsprung parts, or the lever 66 will be rocked counterclockwise about the pin 65 in opposition to the fluid under pressure present in the chamber 81 should this movement be such as to decrease the distance between the sprung and unsprung parts of the vehicle. Therefore, it is apparent that a limited amount of either clockwise or counterclockwise rocking of the lever 66 can occur in response to shocks, jolts, etc. without the piston rod 68 and the O-ring seals 87 and 88 carried thereby being moved to the position in which the upper O-ring seal 87 carried by the piston rod 68 would form a seal with the wall surface of the bore 76 at a location below the location at which the lower end of the passageway 90 opens at the wall surface of this bore 76, or to the position in which the O-ring seal 88, which is now at the lower end of the elongated groove 85, would form a seal with the wall surface of the bore 76 at a location above the location at which the lower end of the passageway 90 opens at the wall surface of the bore 76.

Should the piston rod 68 be moved to the first of the two above-mentioned positions, fluid under pressure would be released from the chamber 10 to atmosphere via passageways 9 and 90, bore 76, port 89, recess 78, chamber 82 and passageway 84. This release of fluid under pressure from the chamber 10 to atmosphere would cause the relay valve device 5 to operate to effect an undesired brake release to a degree corresponding to the reduction of pressure effected in chamber 10.

Likewise, should the piston rod 68 be moved to the second of the two above-mentioned positions, the groove 86 on this piston rod would establish a communication between passageways 90 and 91. It will be understood that if this communication were established at this time, fluid under pressure would flow from the passageway 90 to the chamber 56 via the groove 86 and passageway 91 whereupon the pressure on the opposite sides of the smaller diaphragm 22 would become equalized thereby rendering the spring 61 effective to return the smaller diaphragm 22 and the diaphragm follower 57 to the position shown in FIG. 1 thereby providing a lost-motion connection between the diaphragms 23 and 22. The fluid under pressure present in the chamber 10 would then act in an upward direction on the effective area of the larger diaphragm 22 rather than on an area equal to the difference in the effective areas of the diaphragms 23 and 22. The fluid under pressure in the chamber 10 thus acting in an upward direction on the effective area of the larger diaphragm 23 would deflect this diaphragm in an upward direction to cause stem 33 to unseat valve 45 from its seat 52 whereupon fluid under pressure would flow from the supply reservoir 13 to the brake cylinder 7 and chamber 24 above the diaphragm 23 until the pressure therein would be substantially the same as that in the chamber 10. It is apparent that this further build-up of pressure in the pressure chamber of the brake cylinder 7 would provide an excessive braking force on the empty vehicle which excessive braking force could possibly result in flat spots on the tread surface of the vehicle wheels.

It is apparent from the foregoing that the length of the grooves 85 and 86 and the location of the O-ring seals 87 on the piston rod 68 may be so selected and arranged as to provide for a limited amount of clockwise or counterclockwise rocking of the lever 66 about the pin 65 in response to shocks, jolts, vertical movement and sidewise rocking of the body of the railway vehicle relative to the vehicle truck frame without effecting either an undesired brake release or an excessive braking force on the wheels of the railway vehicle.

RELEASE OF A SERVICE APPLICATION ON AN EMPTY VEHICLE

When it is desired to effect a release of a service brake application, the pressure in the brake pipe 2 will be increased in the usual manner to cause the service slide valve (not shown) of the service portion 8 of the brake control valve 1 to be returned to its release position so that a communication is established therethrough from the chamber 10 in the relay valve device 5 to atmosphere. Consequently, all of the fluid under pressure present in the chamber 10 will be vented to atmosphere. Likewise, fluid under pressure will be vented from the chamber 81 and volume reservoir 11.

When all of the fluid under pressure in the chamber 10 is vented to atmosphere in the manner just described, the spring 61 is effective to return the smaller diaphragm 22, diaphragm follower 57, diaphragm follower plate 58 and stem 60 to the position shown in FIG. 1.

As all of the fluid under pressure is released from the chamber 10 to atmosphere, the fluid under pressure present in the chamber 24 is rendered effective to deflect the diaphragm 23 downward to move the stem 33 to the position shown. Fluid under pressure will now be released from the pressure chamber in the brake cylinder 7 to atmosphere via pipe and passageway 44, chamber 28, ports 30, bore 25, bottomed bore 41, cross-bore 42, groove 43, ports 31, chamber 29, and passageway 32 thereby releasing the brakes on the vehicle, it being understood that the fluid under pressure in the chamber 24 is simultaneously released to atmosphere since chamber 24 is connected to the passageway 44 via choke 54 and passageway 53.

Since fluid under pressure is released from the chamber 81 to atmosphere simultaneously as fluid under pressure is released from the chamber 10, the spring 79 is rendered effective to move the piston 69 and piston rod 68 upward to the position shown in FIG. 1 in which the piston 69 abuts the stops 80.

As the piston 69 and piston rod 68 are thus moved upward to the position shown in FIG. 1, it is apparent that the lever 66 is simultaneously rocked counterclockwise about the pin 65 from the position in which the foot 75 abuts the stop 19 to the position in which the lever 66 and foot 75 are shown in FIG. 1.

As the pressure in the brake pipe 2 is charged to the normal fully charged pressure carried therein, fluid under pressure will flow from the brake pipe 2 via the brake control valve device 1 to the auxiliary reservoir 3, the emergency reservoir 4, and the supply reservoir 13 to charge these reservoirs until the pressure therein is substantially the same as that in the brake pipe 2.

SERVICE APPLICATION OF THE BRAKES ON A LOADED VEHICLE

Let it be supposed that the brake equipment shown in FIG. 1 has been charged in the manner hereinbefore described and that the vehicle is fully loaded.

The load on the vehicle is effective to compress the springs of the vehicle truck so that the sprung part that carries the relay valve device 5 is moved downward from the position it occupied while the vehicle was empty a distance proportional to the load carried by the vehicle. Consequently, the distance between the foot 75 and the stop 19 will decrease as the load on the body or sprung part of the vehicle is increased.

When a service brake application is effected in the manner hereinbefore described and fluid under pressure is supplied to the pipe and passageway 9 and thence to the chamber 81 via the passageway 83 it will act on the upper face of the piston 69 to move this piston and the piston rod 68 downward and effect clockwise rocking of the lever 66 about the pin 65 until the foot 75 is moved into abutting relationship with the stop 19.

The fluid under pressure supplied to the passageway 9 will also flow to the interior of the bore 76 via the passageway 90 and move the O-ring seal 88 to the upper end of the elongated groove 85 in the same manner as hereinbefore explained. The length of the elongated groove 85 may be so selected that, with the O-ring seal 88 at the upper end of this groove 85, this O-ring seal 88 will not be moved past the location at which the lower end of the passageway 90 opens at the wall surface of the bore 76 until the piston 69 and piston rod 68 reach a position corresponding to the load on the body of the vehicle being, for example, 20 percent of the total load-carrying capacity of the vehicle. However, since it has been assumed that the vehicle is fully loaded, it will be understood that, subsequent to the fluid under pressure from the passageway 9 moving the O-ring seal 88 to the upper end of the elongated groove 85, the fluid under pressure present in the chamber 81 and acting on the upper face of the piston 69 will not move this piston and the piston rod 68 downward far enough for the O-ring seal 88 to be moved past the location at which the lower end of the passageway 90 opens at the wall surface of the bore 76 before the foot 75 is moved into abutting relationship with the stop 19. In other words, while the vehicle is fully loaded, when the foot 75 is moved into abutting relationship with the stop 19, the O-ring seal 88 forms a seal with the wall surface of the bore 76 at a location above the location at which the lower end of the passageway 90 opens at the wall surface of this bore 76. It will be further understood that, while the piston rod 68 is in this fully loaded position, the lower O-ring seal 87 carried by this piston rod 68 forms a seal with the wall surface of the bore 76 at a location that is below the location at which the right-hand end of the passageway 91 opens at the wall surface of the bore 76 and above the location at which the left-hand end of the atmospheric passageway 92 opens at the wall surface of this bore 76 so that this lower O-ring seal 87 is effective to close communication between the passageways 91 and 92 thereby cutting off the chamber 56 from atmosphere.

From the foregoing, it is apparent that the elongated peripheral annular groove 86 and that portion of the elongated peripheral annular groove 85 below the O-ring seal 88, which is now at the upper end of this groove 85, establish a communication between the passageways 90 and 91. Consequently, part of the fluid under pressure supplied to the passageway 9 when a service brake application is effected will flow to the chamber 10 above the smaller diaphragm 22, and part of this fluid under pressure will flow to the chamber 56 below this diaphragm 22 via passageway 90, grooves 85 and 86 on the piston rod 68 and the passageway 91.

It is apparent from the foregoing that, since fluid at the same pressure is supplied to the chamber 10 above the smaller diaphragm 22 and to the chamber 56 below this diaphragm, the fluid pressure forces acting on the opposite sides of this diaphragm are equal. Consequently, the spring 61 is effective to maintain the diaphragm follower 57 against the stop 62 to thereby provide a lost-motion connection between the diaphragms 22 and 23.

Accordingly, it is apparent that the fluid under pressure supplied from the passageway 9 to the chamber 10 acts in an upward direction on the entire effective area of the larger diaphragm 23 to deflect this diaphragm in the direction to first move the valve stem 33 upward to the position in which the upper end thereof abuts the lower face of the valve 45 to close communication between the pressure chamber in the brake cylinder 7 and atmosphere, and thereafter effect unseating of the valve 45 from the valve seat 52 whereupon fluid under pressure flows from the supply reservoir 13 to the pressure chamber in the brake cylinder 7 to effect a service brake application.

Fluid under pressure supplied to the brake cylinder 7 also flows from the passageway 44 to the chamber 24 above the larger diaphragm 23 via passageway 53 and choke 54 where it acts in a downward direction over the effective area of this diaphragm. Consequently, when the pressure in the chamber 24 is increased to substantially the same value as that in the chamber 10, the opposing fluid pressure forces acting on the diaphragm 23 will be balanced whereupon the spring 51 will effect reseating of the valve 45 on its seat 52 to cut off further supply of fluid under pressure to the pressure chamber in the brake cylinder 7 and the chamber 24.

Since fluid under pressure is supplied to the chamber 24 until it substantially equals the pressure in the chamber 10, it is apparent that this pressure, which is the same as that in the pressure chamber of the brake cylinder 7, provides for a greater braking force on the loaded vehicle than is provided for an empty vehicle.

It should be noted that the above-described upward deflection of the larger diaphragm 23 to effect unseating of the valve 45 to effect the supply of fluid under pressure to the pressure chamber of the brake cylinder 7 to cause a brake application on the loaded vehicle does not move the collar 35 upward far enough for this collar to abut the forked member 63. Consequently, there is a lost-motion connection between the diaphragms 23 and 22 wherever the relay valve device 5 operates while the vehicle is fully loaded to cause a service brake application on the vehicle.

As has been hereinbefore stated, while the brakes are applied on a fully loaded vehicle, the O-ring seal 88 is at the upper end of the groove 85 and forms a seal with the wall surface of the bore 76 at a location that is above the location at which the lower end of the passageway 90 opens at the wall surface of the bore 76 and below the location at which the port 89 opens at the wall surface of this bore 76. Also, at this time the lower O-ring seal 87 carried by the piston rod 68 forms a seal with the wall surface of the bore 76 at a location that is below the location at which the right-hand end of the passageway 91 opens at the wall surface of the bore 76 and above the location at which the left-hand end of passageway 92 opens at this wall surface.

Furthermore, while the brakes are applied the foot 75 is in abutting relationship with the stop 19, as stated above.

Accordingly, should any relative movement between the sprung and unsprung parts of the railway vehicle now occur as the result of shocks, jolts, vertical movement or sidewise rocking of the sprung part or the vehicle body relative to the unsprung truck side frame while the train is traveling at high speed, it is apparent that the lever 66 will be rocked clockwise about the pin 65 by the fluid under pressure present in the chamber 81 should this movement be such as to increase the distance between the sprung and unsprung parts of the vehicle. Therefore, it is apparent that a limited amount of clockwise rocking of the lever 66 can occur in response to shocks, jolts, etc. without the piston rod 68 and O-ring seals 87 and 88 carried thereby being moved downward to the position in which the O-ring seal 88, which is at the upper end of the elongated peripheral annular groove 85, would be below the location at which the lower end of the passageway 90 opens at the wall surface of the bore 76 thereby closing communication between passageways 90 and 91 so that thereafter the fluid under pressure present in this passageway 90 could move this O-ring seal 88 from the upper end of the groove 85 to the lower end of this groove and flow to atmosphere via the clearance between the peripheral surface of piston rod 68 and the wall surface of the bore 76, port 89, recess 78, chamber 82 and passageway 84 to thereby cause a reduction of pressure in the chamber 10 whereupon the relay valve device 5 would operate to release fluid under pressure from the pressure chamber of the brake cylinder 7 thereby effecting an undesired brake release on the fully loaded vehicle to a degree corresponding to the reduction of pressure effective in chamber 10.

Furthermore, it is also apparent that a limited amount of counterclockwise rocking of the lever 66 can occur without the piston rod 68 and O-ring seals 87 and 88 carried thereby being moved upward to the position in which the O-ring seal 88, which is at the upper end of the elongated peripheral annular groove 85, would be above the location at which the port 89 opens at the wall surface of the bore 76 so that the fluid under pressure present in the chamber 10 could flow to atmosphere via passageways 9 and 90, groove 85, port 89, recess 78, chamber 82 and passageway 84 to cause the relay valve device 5 to operate to release fluid under pressure from the pressure chamber of the brake cylinder 7 and thereby effect an undesired brake release on the fully loaded vehicle to a degree corresponding to the reduction of pressure effected in chamber 10.

Moreover, it may be noted that a limited amount of counterclockwise rocking of the lever 66 can occur without the piston rod 68 being moved upward to the position in which the lower O-ring seal 87 carried thereby makes a seal with the wall surface of the bore 76 above the location at which the right-hand end of passageway 91 opens into bore 76. Should the piston rod 68 be moved to this position while the brakes are applied on a fully loaded vehicle, communication would be closed between the passageways 90 and 91, and the fluid under pressure present in the chamber 56 would be released to atmosphere via passageways 91, bore 76 and passageway 92.

Should fluid under pressure be released from the chamber 56 in the manner just described, the fluid under pressure present in the chamber 10 would deflect the smaller diaphragm 22 downward against the yielding resistance of the spring 61 until the forked member 63 was moved into abutting contact with the collar 35. Thereafter, the fluid under pressure present in the chamber 10 would act in an upward direction on an area equal to the difference in the effective areas of the diaphragms 23 and 22. Since this area is less than the effective area of the larger diaphragm 23 which is at this time subject on its upper side to the fluid under pressure present in the chamber 24, it is apparent that the fluid pressure force acting in a downward direction on the effective area of the larger diaphragms 24 would be greater than the fluid pressure force acting in an upward direction on an area equal to the difference in the effective areas of the diaphragms 23 and 22. Accordingly, it is apparent that this greater fluid pressure force acting downward on the effective area of the larger diaphragm 23 would operate the relay valve device 5 to release fluid under pressure from the pressure chamber of the brake cylinder 7 and the chamber 24 to atmosphere until the reduced pressure in the chamber 24 acting on the effective area of the diaphragm 23 established a fluid pressure force that acts in a downward direction which would be substantially equal to the fluid pressure force acting in an upward direction as the result of the fluid under pressure present in the chamber 10 and acting on an area equal to the difference in the effective areas of the larger diaphragm 23 and the smaller diaphragm 22. Of course such a partial release of the brakes on a fully loaded vehicle is undesirable.

RELEASE OF A SERVICE APPLICATION OF BRAKES ON A LOADED VEHICLE

To release a service brake application on a fully loaded vehicle, the pressure in the brake pipe 2 is increased to its normal charged value to cause the brake control valve 1 to return to its release position whereupon all fluid under pressure in the chambers 10, 56 and 81 in the relay valve device 5 is vented to atmosphere via the brake control valve 1 in the manner hereinbefore described.

As fluid under pressure is released from the chamber 10, the relay valve device 5 operates in the manner hereinbefore described to release all fluid under pressure in the pressure chamber of the brake cylinder 7 to atmosphere thereby releasing the service brake application on the loaded vehicle.

EMERGENCY APPLICATION AND RELEASE OF BRAKES

An emergency brake application on both an empty and a loaded vehicle differs from a service brake application only in that when an emergency brake application is effected, fluid under pressure is supplied from both the auxiliary reservoir 3 and the emergency reservoir 4 to the chamber 10 in the relay valve device 5. By applying fluid under pressure from both the auxiliary reservoir 3 and the emergency reservoir 4, a higher equalization pressure is obtained in the chamber 10 and, therefore, a higher pressure is established in the pressure chamber of the brake cylinder 7. This higher braking pressure in the pressure chamber of the brake cylinder 7 causes a higher braking force to be transmitted by this brake cylinder 7 to the brake shoes (not shown) for pressing the brake shoes against the tread surface of the vehicle wheels.

The release of an emergency brake application on either an empty or a loaded vehicle is identical to the release of a service brake application, except that when effecting a brake release subsequent to an emergency brake application, the emergency reservoir 4 is also recharged from the brake pipe 2 to substantially the pressure carried therein.

OPERATION — VEHICLE PARTLY LOADED

The length of the elongated peripheral annular groove 85 that carries the sliding O-ring seal 88 may be so selected that this O-ring seal 88 is moved from the upper end of the groove 85 to the lower end of this groove by fluid under pressure from the passageway 90 whenever a brake application is effected so long as the load carried by the body of the vehicle does not exceed a first chosen percentage, for example 20, of the total load-carrying capacity of the vehicle or, stated in other words, so long as the deflection of the vehicle truck springs which support the body or sprung part of the vehicle does not exceed a chosen percentage of the total spring deflection. Therefore, when a load that is placed on the vehicle body is less than the above-mentioned chosen percentage of the total load-carrying capacity of the vehicle, the piston 69 and piston rod 68 will be moved downward far enough before the lever 66 moves foot 75 into abutting relationship with the stop 19 for the O-ring seal 88, which is originally at the upper end of the elongated groove 85, to be in such a location that the fluid under pressure supplied to the passageways 9 and 90 when a brake application is effected will be cut off by this O-ring seal 88 from the chamber 56 and will at this time move or shift this O-ring seal 88 from the upper end of the groove 85 to the lower end of this groove. Accordingly, it is apparent that, subsequent to this shifting of the O-ring seal 88 from the upper to the lower end of the groove 85, the lever 66 can be rocked counterclockwise about the pin 65 in response to jolts, shocks, etc. through an arc the length of which corresponds substantially to the length of the elongated peripheral annular groove 85 without the O-ring seal 88 being moved upward to the position in which it forms a seal with the wall surface of the bore 76 just above the location at which the lower end of the passageway 90 opens at the wall surface of this bore 76 it being apparent that if the O-ring seal 88 were moved to this position, fluid under pressure from passageway 90 would shift it to the upper end of groove 85 and also a communication would be established between passageways 90 and 91. Of course, this would be undesirable at this time as the supply of fluid under pressure to the chamber 56 would cause the relay valve device 5 to operate to establish in the pressure chamber of the brake cylinder 7 a fluid pressure that would provide the braking force required to brake a fully loaded car.

Considering that the load carried by the body of the vehicle is not less than a second chosen percentage, for example 80, of the total load-carrying capacity of the vehicle, it will be apparent that the piston 69 and piston rod 68 are moved to the position in which fluid under pressure from the passageway 90 shifts the O-ring seal 88 from the upper to the lower end of the elongated peripheral annular groove 85 prior to the lever 66 moving the foot 75 into abutting relationship with the stop 19. Consequently, when the foot 75 is in abutting relationship with the stop 19, the O-ring seal 88 is at the lower end of the groove 85 and is effective to close communication between the passageways 90 and 91 so that no fluid under pressure is supplied to the chamber 56 to cause equalization of pressure on the opposite sides of the smaller diaphragm 22. Accordingly, it is apparent that the lever 66 can be rocked counterclockwise about the pin 65 in response to jolts, shocks, etc. through an arc the length of which corresponds substantially to the length of the elongated peripheral annular groove 85 without the O-ring seal 88 being moved upward to the position in which it forms a seal with the wall surface of the bore 76 just above the location at which the lower end of the passageway 90 opens at the wall surface of this bore 76 whereupon fluid under pressure from the passageway 90 would shift the O-ring seal 85 to the upper end of the groove 85 and also flow to the chamber 56. For the reasons hereinbefore explained, this would be undesirable.

From the foregoing, it is apparent that the sliding O-ring seal 88 provides for a limited amount of rocking of the load-sensing lever 66 about the pin 64 in response to jolts, shocks, vertical movement and sidewise rocking of the sprung vehicle body relative to the unsprung truck side frame while the vehicle is traveling at high speed without effecting an undesired change of the pressure in the chamber 56 in the relay valve device 5.

DESCRIPTION — FIGS. 2, 3 AND 4

Figure 2:
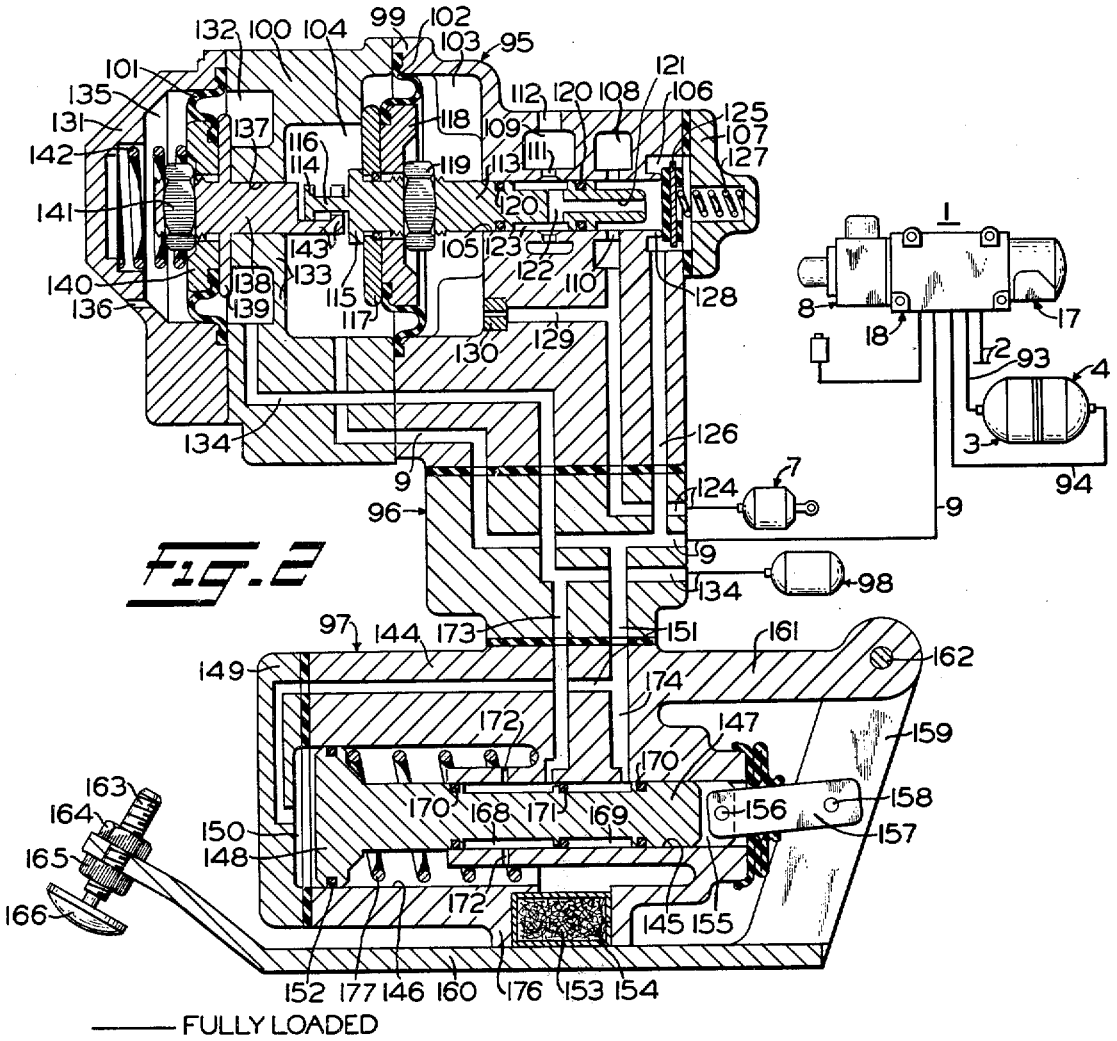

In FIG. 2 of the drawings, there is shown an empty and load fluid pressure brake equipment constructed in accordance with a second embodiment of the invention. According to this second embodiment of the invention, the empty and load fluid pressure brake equipment shown in FIG. 2 differs from that shown in FIG. 1 in that the supply reservoir and charging check valve therefor are omitted, and in that the relay valve device 5 shown in FIG. 1 is replaced by a relay valve device 95 that is different in construction than the relay valve device 5. The relay valve device 95 is secured to the upper side of a pipe bracket 96 to the lower side of which is secured a load-sensing mechanism 97 the operation of which is somewhat different than the operation of the load-sensing mechanism embodied in the relay valve device 5. Accordingly, like reference numerals have been used to designate the structure shown in FIG. 2 which is identical to that shown in FIG. 1. Only such features of the structure and operation of the embodiment of the invention shown in FIG. 2 which are different than that of the embodiment of FIG. 1 will be hereinafter described.

According to the second embodiment of the invention disclosed in FIG. 2, this empty and load fluid pressure brake equipment comprises the well-known AB type brake control valve 1 to which is connected the usual brake pipe 2, auxiliary reservoir 3 and emergency reservoir 4. The empty and load fluid pressure brake equipment shown in FIG. 2 further includes the above-mentioned pipe bracket 96 to which all pipe connections are made, the relay valve device 95 secured to the upper side of this pipe bracket, the load-sensing mechanism 97 secured to the lower side of the pipe bracket 96, a dummy volume reservoir 98, and the brake cylinder 7.

The relay valve device 95 is of the double-diaphragm self-lapping type and comprises, as shown in FIG. 2, a sectionalized casing embodying two casing sections 99 and 100 and two coaxially arranged movable abutments or diaphragms 101 and 102. The outer periphery of the larger diaphragm 102 is clamped between the casing sections 99 and 100 which are secured together by any suitable means (not shown).

The diaphragm 102 cooperates with the casing sections 99 and 100 to form within the relay valve device 95 and on the opposite sides of the diaphragm 102, a pair of chambers 103 and 104 the latter being connected to the pipe 9 by a correspondingly numbered passageway.

The casing section 99 of the above-mentioned sectionalized casing of the relay valve device 95 is provided with a bore 105 that at its right-hand end opens into a chamber 106 formed by the cooperative relationship between the right-hand end of the casing section 99 and a cover member 107 secured to the casing section 99 by any suitable means (not shown). The opposite or left-hand end of the bore 105 opens into the chamber 103, and intermediate its ends this bore 105 opens respectively, into two spaced-apart annular chambers 108 and 109 formed in the casing section 99 via two sets of arcuately spaced ports 110 and 111. The chamber 109 is open to atmosphere via a short passageway 112. Slidably mounted in the bore 105 is a valve stem 113 having adjacent its left-hand end a pair of spaced-apart collars 114 and 115 between which is a portion 116 of reduced diameter.

At the right-hand side of the collar 115 is a screw-threaded portion of reduced diameter which extends through an annular diaphragm follower 117 and an annular diaphragm follower plate 118 and receives in screw-threaded engagement therewith a nut 119 whereby the inner periphery of the diaphragm 102 is clamped between the diaphragm follower 117 and diaphragm follower plate 118 to operatively connect valve stem 113 to this diaphragm 102.

At the right-hand side of the nut 119 thereon, the stem 113 is provided with two identical spaced-apart peripheral annular grooves in each of which is disposed an O-ring seal 120 that forms a seal with the wall surface of the bore 105 to prevent leakage of fluid under pressure between the periphery of the valve stem 113 and the wall surface of the bore 105, and from the chambers 103 and 108 to the atmospheric chamber 109.

The valve stem 113 is provided with a bottomed bore 121 and a crossbore 122 the opposite ends of which open onto an elongated peripheral annular groove 123 formed on the stem 113 intermediate the two O-ring seals 120 carried thereby. The groove 123 is so located that, while the stem 113 occupies the position shown in FIG. 2, the pressure chamber in the brake cylinder 7 is open to atmosphere via a pipe and corresponding passageway 124 that extends through the pipe bracket 96 and casing section 99 to the chamber 108, chamber 108, ports 110, bore 105, bottomed bore 121, crossbore 122, groove 123, ports 111, chamber 109 and the short passageway 112.

A flat disc-type valve 125 is disposed in the chamber 106 which is supplied with fluid under pressure from the pipe and passageway 9 via a passageway 126 when the brake control valve 1 is operated to its service or emergency position to supply fluid under pressure from, respectively, the auxiliary reservoir 3 or from both the auxiliary reservoir 3 and the emergency reservoir 4.

Interposed between the cover member 107 and the valve 125 is a spring 127 which is effective to normally bias the valve 125 against an annular valve seat 128 formed at the right-hand end of the bore 105 to close communication between the chamber 106 and the interior of the bore 105 except when the valve 125 is unseated in a manner hereinafter described. The valve 125 thus controls communication between the chamber 106, to which fluid under pressure is supplied by operation of the brake control valve 1 to its service or emergency position, and the interior of the bore 105 from which fluid under pressure may flow to the brake cylinder 7 via ports 110, chamber 108, and passageawy and pipe 124.

The above-mentioned passageway 124 is connected to the chamber 103 by a passageway 129 provided in the casing section 99 and a choke 130 disposed in this passageway.

The outer periphery of the smaller diaphragm 101 is clamped between the casing section 100 and a second cover member 131 which is secured to the casing section 100 by any suitable means (not shown). The diaphragm 101 cooperates with the casing section 100 to form on the right-hand side of this diaphragm a chamber 132 which is separated from the hereinbefore-mentioned chamber 104 by a wall 133 that is integral with the casing section 100. This chamber 132 is connected to the hereinbefore-mentioned dummy volume reservoir 98 by a passageway 134 that extends through the casing section 100 and pipe bracket 96 and a correspondingly numbered pipe.

Likewise, the diaphragm 101 cooperates with the second cover member 131 to form on the left-hand side of this diaphragm a chamber 135 that is constantly open to atmosphere via a port 136 divided in this cover member.

As shown in FIG. 2 of the drawings, the hereinbefore-mentioned wall 133 that separates the chambers 104 and 132 is provided with a bore 137 in which is slidably disposed a stem 138 that has formed integral therewith intermediate its ends a diaphragm follower 139 that is disposed in the chamber 132.

The inner periphery of the diaphragm 101 is clamped between the diaphragm follower 139 and an annular diaphragm follower plate 140 by a nut 141 that has screw-threaded engagement with screw threads provided on the left-hand end of the stem 138.

The spring 142 disposed in the chamber 135 is interposed between the second cover member 131 and the diaphragm follower plate 140 for normally biasing the diaphragm follower 139 against the left-hand side of the wall 133.

A lost-motion connection is provided between the two diaphragms 101 and 102 by a forked portion or member 143 that is formed integral with the stem 138 at the right-hand end thereof so as to straddle the portion 116 of reduced diameter that connects the collars 114 and 115.

The above-mentioned load-sensing mechanism 97 comprises a body 144 that is secured to the lower side of the pipe bracket 96 by any suitable means (not shown). This body 144 is provided with a bore 145 and a coaxial counterbore 146 in which are respectively slidably disposed a spool-type valve 147 and a piston 148 that is formed integral with the left-hand end of this spool valve. The left-hand end of the counterbore 146 is closed by a pressure head 149 that is secured by any suitable means (not shown) to the left-hand end of the body 144. This pressure head 149 cooperates with the piston 148 and the wall surface of the counterbore 146 to form at the left-hand side of this piston a chamber 150 into which opens one end of a passageway 151 that extends through the pressure head 149, body 144 and pipe bracket 96 and opens at its opposite end into the passageway 9 intermediate the ends thereof.

The piston 148 is provided with a peripheral annular groove in which is disposed an O-ring seal 152 which prevents leakage of fluid under pressure from the chamber 150 to the interior of the counterbore 146 at the right-hand side of this piston it being noted that this counterbore 146 is open to atmosphere via a suitable air strainer or filter device 153 that is disposed in a bore 154 provided in the body 144.

As can be seen from FIG. 2, the right-hand end of the spool valve 147 is provided with a clevis 155 in the opposite jaws of which are anchored the ends of a pin 156 that pivotally connects the left-hand end of a link 157 to the right-hand end of the spool valve 147. The right-hand end of this link 157 is pivotally connected by a pin 158 to a clevis 159 in the opposite jaws of which the ends of the pin 158 are anchored intermediate the ends of these jaws, it being noted that only one of these jaws appears in FIG. 2.

The clevis 159 is formed at one end of a load-sensing lever 160 which is pivotally mounted on an arm 161 that is integral with the body 144 by a pin 162 that extends through a bore provided in the arm 161 and has its opposite ends anchored in the jaws of this clevis adjacent the upper end of these jaws.

Adjacent its left-hand end, the lever 160 is provided with a screw-threaded bore which receives a screw-threaded stem 163 that carries two lock nuts 164 and 165 that provide for adjusting the stem 163 with respect to the lever 160 and then locking this stem in its adjusted position. By adjusting the position with the stem 163, the lower end of which is provided with a foot 166 that is rockable, in a manner hereinafter explained, into abutting relationship with a stop 167 carried by the unsprung truck side frame, the empty and load brake apparatus constituting the second embodiment of the present invention can be adapted for use on railway vehicles having different spring deflections.

The above-mentioned spool valve 147 has two spaced-apart elongated peripheral annular grooves 168 and 169, and carries in two peripheral annular grooves, one adjacent the left-hand end of the elongated groove 168 and the other adjacent the right-hand end of the elongated groove 169, two O-ring seals 170 for preventing leakage of fluid under pressure along the bore 145. Another O-ring seal 171 is reciprocable within and relative to the elongated groove 169 so as to serve as a valve in a manner hereinafter made apparent.

While the spool valve 147 occupies the position shown in FIG. 2, a pair of ports 172 provided in the body 144 provides a communication between the interior of the counterbore 146 and the interior of the bore 145 intermediate the ends of the elongated groove 168 it being noted that opening at the wall surface of the bore 145 adjacent the right-hand end of this groove 168 and on the right side of the port 172 is one end of a passageway 173 that extends through the body 144 and pipe bracket 96 and at its opposite end opens into the passageway 134 intermediate the ends thereof.

Furthermore, while the spool valve 147 occupies the position shown in FIG. 2, it can be seen that opening at the wall surface of the bore 145 adjacent the right-hand end of the elongated groove 169 is one end of a passageway 174 that extends through the body 144 and opens into the passageway 151 intermediate the ends thereof.

The piston 148, spool valve 147 and lever 160 are normally biased to the position shown in FIG. 2 in which the lever 160 abuts a boss 176 integral with the body 144 by a light spring 177 that is disposed in surrounding relation to the spool valve 147 and interposed between the piston 148 and the body 144.

OPERATION — FIGS. 2, 3 AND 4

INITIAL CHARGING

The empty and load fluid pressure brake equipment shown in FIG. 2 is initially charged in the same manner as hereinbefore described for the brake equipment shown in FIG. 1.

It will be understood that at this time the brake cylinder 7 and the various chambers in the relay valve device 95 and load-sensing mechanism 97 are devoid of fluid under pressure.

SERVICE APPLICATION OF THE BRAKES ON AN EMPTY VEHICLE

When it is desired to effect a partial service application of the brakes on an empty vehicle, the pressure in the brake pipe 2 will be reduced in the usual manner to a lower pressure corresponding to the degree of brake application desired by operation of the brake valve on the locomotive to cause the brake control valve 1 to effect the supply of fluid under pressure from the auxiliary reservoir 3 to the pipe and passageway 9 and establish therein a pressure corresponding to the degree of reduction of pressure effected in the brake pipe 2.

Fluid under pressure thus supplied to the passageway 9 flows simultaneously therefrom to: (1) the chamber 150 in the load-measuring mechanism 97 via the passageway 151, (2) the chamber 106 in the relay valve device 95 via the passageway 126, and (3) the chamber 104 also in relay valve device 95.

Fluid under pressure thus supplied to the chamber 150 acts on the left-hand face of the piston 148 to move this piston and the spool valve 147 in the direction of the right hand against the yielding resistance of the spring 177 to effect via the link 157 counterclockwise rocking of the lever 160 about the pin 162 until the foot 166 is moved into abutting relationship with the stop 167. Since the vehicle may be assumed to be empty, the foot 166 is at a maximum distance from the stop 167. Therefore, the spool valve 147 is moved in the direction of the right hand from the position shown in FIG. 2 to the position shown in FIG. 3. As the spool valve 147 is thus moved in the direction of the right hand, the O-ring seal 171, which is at the left-hand end of the groove 169, as shown in FIG. 1, is moved past the location at which the lower end of the passageway 174 opens at the wall surface of the bore 145. Accordingly, as soon as the O-ring seal 171 is moved past the location at which the lower end of the passageway 174 opens at the wall surface of the bore 145, the fluid under pressure present in the passageways 9 and 151 and likewise in the passageway 174 is rendered effective to move the O-ring seal 171 from the left-hand end of the groove 169 to the right-hand end thereof in which position it is shown in FIG. 3.

Figure 3:
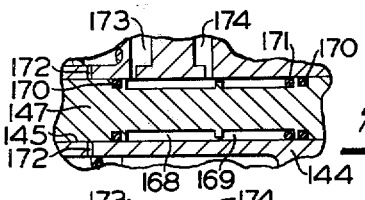
FIG. 3 is a partial cross-sectional view of the spool-type valve shown in spool-type valve being shown in the position it occupies while the vehicle is empty.

It will be noted from FIG. 3 that, while the spool valve 147 is in the empty position, the O-ring seal 171 is at the right-hand end of the groove 169 and the O-ring seal 170 adjacent the left-hand end of the groove 168 forms a seal with the wall surface of the bore 145 at a location at the left-hand side of the location at which the lower end of the passageway 173 opens at the wall surface of the bore 145 so that the groove 168 is effective to establish a communication between the passageways 174 and 173. Accordingly, fluid under pressure supplied to the passageway 9 in the manner described above will now flow to the chamber 132 in the relay valve device 95 via passageways 151 and 174, elongated peripheral annular groove 168 on spool valve 147, and passageways 173 and 134 it being noted that passageway 134 is connected by the correspondingly numbered pipe to the volume 98 so that fluid under pressure is supplied from the passageway 9 simultaneously to the chamber 132 and the volume reservoir 98.

The fluid under pressure thus supplied to the chamber 132 will act in the direction of the left hand on the effective area of the smaller diaphragm 101 to deflect it in the direction of the left hand against the yielding resistance of the spring 142 and move the stem 138 and forked member 143 in the same direction until this forked member abuts the collar 114.

With the forked member 143 in abutting relationship with the collar 114, a rigid connection is provided between the larger diaphragm 102, the effective area of the left-hand side of which is subject to the fluid under pressure supplied to the chamber 104, and the smaller diaphragm 101, the effective area of the right-hand side of which is subject to the fluid under pressure supplied to the chamber 132. Consequently, fluid under pressure acts in the direction of the right hand on an area equal to the difference in the effective areas of the diaphragms 102 and 101 to provide a fluid pressure force that moves the diaphragm stack comprising the diaphragms 101 and 102 and the valve stem 113 in the direction of the right hand to unseat valve 125 from its seat 128 in the same manner as hereinbefore explained for the valve 45 of the relay valve device 5.

Upon the unseating of valve 125 from its seat 128, fluid under pressure present in the chamber 106 and supplied thereto from the auxiliary reservoir 3 via pipe 93, the service portion 8 of the brake control valve device 1, which service portion is not in its service position, pipe and passageway 9, and passageway 126, will flow to the brake cylinder 7 past the unseated valve 125, and thence via the bore 105, ports 110, chamber 108 and passageway and corresponding pipe 124.

It will be noted that at this time the auxiliary reservoir 3 is now connected to the brake cylinder 7 via pipe 93, the service portion 8 of the brake control valve 1, which service portion is in its service application position, pipe and passaseway 9, passageway 126, chamber 106, bore 105, ports 110, chamber 108 and passageway and pipe 124.

It will also be noted that at this time the auxiliary reservoir 3 is connected to the volume reservoir 98 via pipe 93, the service portion 8 now in its service position, pipe and passageway 9, passageways 151 and 174, elongated peripheral annular groove 168 on spool valve 147 (FIG. 3), passageway 173, and passageway and pipe 134. Accordingly, the volume of this reservoir 98 is so selected as to insure that a lower pressure will be provided in the chambers 104 and 132 than would be the case if no volume reservoir were used. With this lower pressure provided in the chambers 104 and 132, a corresponding lower pressure will be obtained in the chamber 103 and in the pressure chamber of the brake cylinder 7.

Some of the fluid under pressure supplied to the passageway 124 in the manner described above flows to the chamber 103 at the right-hand side of the diaphragm 102 via the passageway 129 and choke 130. The fluid under pressure thus supplied to the chamber 103 acts on the effective area of the larger diaphragm 102 in a direction opposite to the direction of the fluid under pressure that is acting on an area equal to the difference in the effective areas of the diaphragms 102 and 101 so that when the oppositely acting fluid pressure forces are substantially balanced, the spring 127 will be rendered effective to move the valve 125, stem 113, and diaphragm 102 in the direction of the left hand to seat valve 125 on seat 128 to cut off flow of fluid under pressure from the auxiliary reservoir 3 to the brake cylinder 7 [and volume reservoir 98], it being understood that as the diaphragm 102 is thus deflected in the direction of the left hand, the fluid under pressure present in the chamber 132 is rendered effective to deflect the diaphragm 101 in this same direction and thereby maintain the forked member 143 in abutting relationship with the collar 114 thus maintaining the rigid connection between the diaphragms 102 and 101. From the foregoing, it is apparent that, since the effective area of the larger diaphragm 102 subject to the pressure of fluid in the chamber chamber 104 is greater than the difference in the effective areas of the diaphragms 102 and 101 and subject to the pressure in the chamber 104, the pressure supplied to the pressure chamber in the brake cylinder 7 and to the chamber 103 is less than the pressure supplied to the chamber 104 and in inverse ratio to the effective areas of the larger diaphragm 102 and the smaller diaphragm 101. It will be understood, however, that this pressure in the pressure chamber of the brake cylinder 7 provides an adequate braking force for an empty vehicle, which of course is less than that required for a loaded vehicle.

While the brakes are applied on an empty vehicle, as has been stated above, the O-ring seal 171 is at the right-hand end of the groove 169 and forms a seal with the wall surface of the bore 145 at a location that is at the right-hand side of the location at which the lower end of the passageway 174 opens at the wall surface of the bore 145.

Furthermore, while the brakes are applied, the foot 166 is in abutting relationship with the stop 167, as aforestated.

Accordingly, should any relative movement between the sprung and unsprung parts of the railway vehicle now occur as the result of shocks, jolts, vertical movement or sidewise rocking of the sprung part or vehicle body while the train is traveling at high speed, it is apparent that the lever 160 will be rocked counterclockwise about the pin 162 by the fluid under pressure present in the chamber 150 should this movement be such as to increase the distance between the sprung and unsprung parts, or the lever 160 will be rocked clockwise about the pin 162 in opposition to the fluid under pressure present in the chamber 150 should this movement be such as to decrease the distance between the sprung and unsprung part of the vehicle. Therefore, it is apparent that a limited amount of either clockwise or counterclockwise rocking of the lever 160 can occur in response to shocks, jolts, etc. without the spool valve 147 and the O-ring seal 171, now at the right-hand end of the groove 169 thereon, being moved to the position in which this O-ring seal 171 would form a seal with the wall surface of the bore 145 at a location on the left-hand side of the location at which the lower end of the passageway 174 opens at the wall surface of this bore 145, or to the position in which the left-hand O-ring seal 170 carried by the spool valve 147 would form a seal with the wall surface of the bore 145 at a location on the right-hand side of the location at which the lower end of the passageway 173 opens at the wall surface of this bore 145.

Should the spool valve 147 be moved to the first of the above-mentioned positions, fluid under pressure from the passageway 174 would move the O-ring seal 171 from the right-hand end of the elongated peripheral annular groove 169 to the left-hand end of this groove, and the fluid under pressure present in the chamber 132 and volume reservoir 98 would be released to atmosphere via passageway and pipe 134, passageway 173, elongated peripheral annular groove 168, ports 172, counterbore 146 and air strainer 153. This release of the fluid under pressure from the chamber 132 to atmosphere would cause the establishment of the lost-motion connection between the diaphragms 102 and 101 whereupon the fluid under pressure present in the chamber 104 would act in the direction of the right-hand on the entire area of the larger diaphragm 102 to cause the relay valve device 95 to operate to increase the pressure in the pressure chamber of the brake cylinder 7 and in the chamber 103 on the right-hand side of the diaphragm 102 until the pressure therein was substantially equal to the pressure in the chamber 104. It is apparent that this further build-up of pressure in the pressure chamber of the brake cylinder 7 at this time would provide an excessive braking force on the empty vehicle which would be undesirable for the same reasons as set forth for the first embodiment of the invention.

Should the spool valve 147 be moved to the second of the above-mentioned positions, fluid under pressure will be released from the chamber 132 and volume reservoir 98 to atmosphere via passageway and pipe 134, passageway 173, along the spool valve 147 between its periphery and the wall surface of the bore 145, ports 172, counterbore 146 and air strainer 153. As a result of this release of fluid under pressure from the chamber 132, the pressure in the pressure chamber of the brake cylinder 7 would be increased in the manner described above.

It is apparent from the foregoing that the length of the grooves 168 and 169 and the location of the O-ring seals 170 on the spool valve 147 may be so selected and arranged as to provide for a limited amount of clockwise or counterclockwise rocking of the lever 160 about the pin 162 in response to shocks, jolts, vertical movement and sidewise rocking of the body of the railway vehicle relative to the vehicle truck frame without effecting an excessive braking force on the wheels of the vehicle.

A full service brake application can now be effected by operation of the brake valve on the locomotive to effect a further reduction of the pressure in the brake pipe 2 to the value required to cause the brake control valve 1 to operate in the usual manner to effect a full service brake application. It will be understood that this operation of the brake control valve 1 effects a corresponding increase in the pressure in the chambers 104 and 132 of the relay valve device 95 whereupon this device 95 operates in the manner hereinbefore described to increase the pressure in the pressure chamber of the brake cylinder 7 an amount corresponding to the further reduction of pressure effected in the brake pipe 2.

RELEASE OF A SERVICE APPLICATION ON AN EMPTY VEHICLE

When it is desired to effect a release of a service brake application, the pressure in the brake pipe 2 will be increased in the usual manner to cause the service slide valve (not shown) of the service portion 8 of the brake control valve 1 to be returned to its release position so that a communication is established therethrough from the chambers 104 and 132 in the relay valve device 95 to atmosphere. Consequently, all of the fluid under pressure present in the chambers 104 and 132 will be vented to atmosphere. Likewise, fluid under pressure will be vented from the chamber 150 and volume reservoir 98.

When all of the fluid under pressure in the chamber 132 is vented to atmosphere in the manner just described, the spring 142 is rendered effective to return the smaller diaphragm 101, diaphragm follower 139, diaphragm follower plate 140, and stem 138 to the position shown in FIG. 2.

As all of the fluid under pressure is released from the chamber 104 to atmosphere, the fluid under pressure present in the chamber 103 is rendered effective to deflect the diaphragm 102 in the direction of the left hand to move the stem 113 to the position shown. Fluid under pressure will now be released from the pressure chamber in the brake cylinder 7 to atmosphere via pipe and passageway 124, chamber 108, ports 110, bore 105, bottomed bore 121, crossbore 122, groove 123, ports 111, chamber 109, and passageway 112 thereby releasing the brakes on the vehicle, it being understood that the fluid under pressure in the chamber 103 is simultaneously released to atmosphere since chamber 103 is connected to the passageway 124 via choke 130 and passageway 129.

As fluid under pressure is released from the chamber 150 to atmosphere simultaneously as fluid under pressure is released from the chambers 104 and 132, the spring 177 is rendered effective to move the piston 148, spool valve 147 and the link 157 in the direction of the left hand to the position shown in FIG. 2 and rock the lever 160 clockwise until it abuts the boss 176.

As the pressure in the brake pipe 2 is charged to the normal fully charged pressure carried therein, fluid under pressure will flow from the brake pipe 2 via the brake control valve device 1 to the auxiliary reservoir 3, and the emergency reservoir 4 to charge these reservoirs until the pressure therein is substantially the same as that in the brake pipe 2.

SERVICE APPLICATION OF THE BRAKES ON A LOADED VEHICLE

Let it be supposed that the brake equipment shown in FIG. 2 has been charged in the manner hereinbefore described and that the vehicle is fully loaded.

The load on the vehicle is effective to compress the springs of the vehicle truck so that the sprung part that carries the relay valve device 95, pipe bracket 96 and load-sensing mechanism 97 is moved downward from the position it occupied while the vehicle was empty a distance proportional to the load carried by the vehicle. Consequently, the distance between the foot 166 and the stop 167 will decrease as the load on the body or sprung part of the vehicle is increased.

When a service brake application is effected in the manner hereinbefore described and fluid under pressure is supplied to the pipe and passageway 9 and thence to the chamber 150 via the passageway 151, it will act on the left-hand face of the piston 148 to move this piston and the spool valve 147 in the direction of the right hand and effect counterclockwise rocking of the lever 160 about the pin 162 until the foot 166 is moved into abutting relationship with the stop 167.

Figure 4:
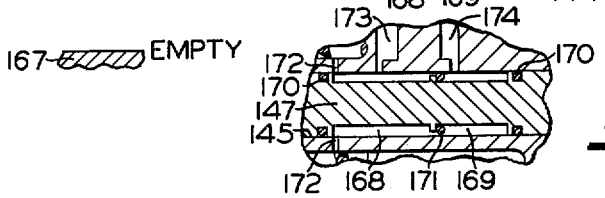
FIG. 4 is a partial cross-sectional view showing the position the spool-type valve occupies while the vehicle is loaded in excess of a chosen percentage of the load-carrying capacity of the vehicle.

The fluid under pressure supplied to the passageway 9 will also flow to the interior of the bore 145 via the passageways 151 and 174 and move the O-ring seal 171 to the left-hand end of the elongated groove 169. The length of the elongated groove 169 may be so selected that, with the O-ring seal 171 at the left-hand end of this groove 169, this O-ring seal 171 will not be moved past the location at which the lower end of the passageway 174 opens at the wall surface of the bore 145 until the piston 148 and spool valve 147 reach a position corresponding to the load on the body of the vehicle being, for example, 20 percent of the total load-carrying capacity of the vehicle. However, since it has been assumed that the vehicle is fully loaded, it will be understood that, subsequent to the fluid under pressure from the passageway 174 moving the O-ring seal 171 to the left-hand end of the elongated groove 169, the fluid under pressure present in the chamber 150 and acting on the left-hand face of the piston 148 will not move this piston and the spool valve 147 in the direction of the right hand far enough for the O-ring seal 171 to be moved past the location at which the lower end of the passageway 174 opens at the wall surface of the bore 145 before the foot 166 is moved into abutting relationship with the stop 167. In other words while the invention is fully loaded, when the foot 166 is moved into abutting relationship with the stop 167, the O-ring seal 171 forms a seal with the wall surface of the bore 145 at a location on the left-hand side of the location at which the lower end of the passageway 174 opens at the wall surface of this bore 145, as shown in FIG. 4. It will be further understood that while the spool valve 147 is in this fully loaded position, O-ring seal 170 carried by this spool valve 147 adjacent the left-hand end of the elongated groove 168 forms a seal with the wall surface of the bore 145 at a location that is on the left-hand side of the location at which the ports 172 open at the wall surface of the bore 145, as shown in FIG. 4. Accordingly, it is apparent from FIG. 4 that the sliding O-ring seal 171 is effective to close communication between the passageways 174 and 173 thereby cutting off the chamber 132 and volume reservoir 98 from the passageway 174. It is further apparent that chamber 132 and volume reservoir 98 are open to atmosphere at this time via passageway and pipe 134, passageway 173, elongated groove 168, ports 172, counterbore 146 and air strainer 153. Consequently, the spring 142 is effective to maintain the diaphragm follower 139 against the wall 133 to thereby provide a lost-motion connection between the diaphragms 102 and 101.

Accordingly, it is apparent that the fluid under pressure supplied from the passageway 9 to the chamber 104 acts in the direction of the right hand on the entire effective area of the larger diaphragm 102 to deflect this diaphragm in the direction to first move the valve stem 113 in the direction of the right hand to the position in which the right-hand end thereof abuts the left-hand face of the valve 125 to close communication between the pressure chamber in the brake cylinder 7 and atmosphere, and thereafter effect unseating of the valve 125 from the valve seat 128 whereupon fluid under pressure flows from the auxiliary reservoir 3 to the pressure chamber in the brake cylinder 7 to effect a service brake application.

Fluid under pressure supplied to the brake cylinder 7 also flows from the passageway 124 to the chamber 103 at the right-hand side of the larger diaphragm 102 via passageway 129 and choke 130 where it acts in the direction of the left hand over the effective area of this diaphragm. Consequently, when the pressure in the chamber 103 is increased to substantially the same value as that in the chamber 104, the opposing fluid pressure forces acting on the opposite sides of the diaphragm 102 will be balanced whereupon the spring 127 will effect reseating of the valve 125 on its seat 128 to cut off further supply of fluid under pressure to the pressure chamber in the brake cylinder 7 and the chamber 103.

Since fluid under pressure is supplied to the chamber 103 until it substantially equals the pressure in the chamber 104, it is apparent that this pressure, which is the same as that in the pressure chamber of the brake cylinder 7, provides for a greater braking force on the loaded vehicle than is provided for an empty vehicle.

It should be noted that the above-described right-hand deflection of the larger diaphragm 102 to effect unseating of the valve 125 to effect the supply of fluid under pressure to the pressure chamber of the brake cylinder 7 to cause a brake application on the loaded vehicle does not move the collar 114 in the direction of the right hand far enough for this collar to abut the forked member 143. Consequently, there is a lost-motion connection between the diaphragms 102 and 101 whenever the relay valve device 95 operates, while the vehicle is fully loaded, to cause a service brake application on the vehicle.

As shown in FIG. 4, while the brakes are applied on a loaded vehicle, the O-ring seal 171 is at the left-hand end of the groove 169 on the spool valve 147 thereby closing communication between the passageways 174 and 173 and preventing flow of fluid under pressure to the chamber 132 and the volume reservoir 98.

Moreover, while the brakes are applied, the foot 166 is in abutting relationship with the stop 167, as aforestated.

Accordingly, as in the first embodiment of the invention, should any relative movement between the sprung and unsprung parts of the railway vehicle now occur as the result of shocks, jolts, vertical movement or sidewise rocking of the sprung part, that is the vehicle body, while the vehicle is traveling at high speed, it is apparent that the lever 160 will be rocked counterclockwise about the pin 162 by the fluid under pressure present in the chamber 150 should this movement increase the distance between the sprung and unsprung parts, or rocked clockwise in opposition to the fluid under pressure in the chamber 150 should this movement decrease this distance. Accordingly, in view of the description given for the first embodiment of the invention, it will be apparent that a limited amount of clockwise or counterclockwise rocking of the lever 160 can occur in response to shocks, jolts, etc., without the spool valve 147 and the O-ring seals 170 and 171 carried thereby being moved to a position to establish a communication between the passageways 174 and 173 which would effect the supply of fluid under pressure to the chamber 132 whereupon the relay valve device 95 would operate to reduce the pressure in the chamber 103 and the pressure chamber of the brake cylinder 7 thereby effecting an undesired partial brake release on the fully loaded vehicle.

RELEASE OF A SERVICE APPLICATION OF BRAKES ON A LOADED VEHICLE

To release a service brake application on a fully loaded vehicle, the pressure in the brake pipe 2 is increased to its normal charged value to cause the brake control valve 1 to return to its release position whereupon all fluid under pressure in the chamber 104 in the relay valve device 95 and in the chamber 150 in the load-sensing mechanism 97 is vented to atmosphere via the brake control valve 1 in the manner hereinbefore described.

As fluid under pressure is released from the chamber 104, the relay valve device 95 operates in the manner hereinbefore described to release all fluid under pressure in the pressure chamber of the brake cylinder 7 to atmosphere thereby releasing the service brake application on the loaded vehicle.

As fluid under pressure is released from the chamber 150 in the load-sensing mechanism 97, the spring 177 is rendered effective to return the piston 148, spool valve 147 and lever 160 to the position shown in FIG. 2 of the drawings.

EMERGENCY APPLICATION AND RELEASE OF BRAKES

An emergency brake application on both an empty and a loaded vehicle provided with the brake equipment shown in FIG. 2 differs from a service brake application in the same manner as hereinbefore described for the first embodiment of the invention shown in FIG. 1.

The release of an emergency brake application on either an empty or a loaded vehicle is identical to the release of a service brake application, except that when effecting a brake release subsequent to an emergency brake application, the emergency reservoir 4 is also recharged from the brake pipe 2 to substantially the pressure carried therein.

Having now described the invention, what I claim as new and desire to secure by Letters Patent, is:

1. For interposition between a brake control pipe and a brake cylinder for effecting a brake application on a vehicle having a sprung part and an unsprung part, a relay valve device mounted on said sprung part and comprising:

a. a pair of spaced-apart movable abutments of unequal effective area, b. means selectively operable to one position to provide a rigid connection between said pair of abutments, and to another position to provide a lost-motion connection between said abutments, wherein the improvement comprises:

c. a fluid pressure supply chamber to which the brake control pipe is connected, d. valve means having an operating stem connected to the larger of said abutments and operable to communicate said supply chamber to said brake cylinder, e. chamber means so associated with said pair of abutments that when pressurized in a first mode causes said abutments to dispose said selectively operable means in said another position and thereafter effect operation of said valve means to provide a first pressure in the brake cylinder in accordance with the effective area of the larger of said pair of abutments, and when pressurized in a second mode causes said abutments to dispose said selectively operable means in said one position and thereafter effect operation of said valve means to provide a second pressure in the brake cylinder in accordance with the difference in the effective areas of said abutments, f. a multiposition valve means which when disposed in one position effects said first mode of pressurization of said chamber means, and when disposed in a second position effects said second mode of pressurization of said chamber means, g. a multiposition lever means operably connected to said multiposition valve means, which lever means when disposed in one position disposes said multiposition valve means in said one position and which when disposed in a second position disposes said multiposition valve means in said second position, and h. stop means carried by the unsprung part of the vehicle which, when engaged by said lever means while the vehicle is loaded, causes said lever means to dispose said multiposition valve means in its said one position, and which, when engaged by said lever means while the vehicle is empty, causes said lever means to dispose said multiposition valve means in its said second position.

2. A relay valve device, as recited in claim 1, further characterized by means normally biasing said multiposition valve means to a third position and by fluid pressure operated means operable upon pressurization of said chamber means in said first mode to move said multiposition valve means against the yielding resistance of said biasing means from said third position to said one position, and upon pressurization of said chamber means in said second mode to move said valve means against the yielding resistance of said biasing means from said third position to said second position.

3. A relay valve device, as recited in claim 1, further characterized in that said multiposition valve means includes a spool-type valve provided with two longitudinally arranged spaced-apart peripheral annular grooves one of which carries an O-ring seal which upon movement of said multiposition valve means to its said one position is movable by fluid under pressure from one end of said one groove to the other end.

4. A relay valve device, as recited in claim 3, further characterized in that, while said multiposition valve means is in said one position, said O-ring seal is movable by fluid under pressure to one end of said one groove to cause pressurization of said chamber means in said first mode, and while said multiposition valve means is in said second position said O-ring seal is movable by fluid under pressure to the opposite end of said one groove to cause pressurization of said chamber means in said second mode.

5. A relay valve device as recited in claim 3, further characterized in that said chamber means comprises two pairs of chambers, the two chambers comprising one pair being disposed on the respective opposite sides of one of said pair of abutments and the two chambers comprising the other pair being disposed on the respective opposite sides of the other of said pair of abutments.

6. A relay valve device, as recited in claim 5, further characterized in that said multiposition valve means while in said one position vents one chamber of one of the said pair of chambers to atmosphere, and while in said second position establishes a communication through which fluid under pressure may be supplied to said one chamber.

7. A relay valve device, as claimed in claim 6, further characterized in that said movable O-ring seal enables limited rocking of said lever means while said multiposition valve means occupies said one position without effecting establishment of said communication, and limited rocking of said lever means while said multiposition valve means occupies said second position without effecting closing of said communication.

8. A relay valve device, as recited in claim 1, further characterized in that the axis of said operating stem is disposed in spaced-apart parallel relation to the axis of said valve means.

9. For interposition between a brake control pipe and a brake cylinder for effecting a brake application on a vehicle having a sprung part and an unsprung part, a relay valve device mounted on said sprung part and comprising:

a. a pair of spaced-apart movable abutments of unequal effective area, b. means selectively operable to provide only while the vehicle is empty a rigid connection between said pair of abutments, and only while the vehicle is loaded a lost-motion connection between said abutments, wherein the improvement comprises:

c. means cooperative with said abutments to provide a chamber on each side of each of said abutments, the chamber on one side of the larger of said abutments constituting a fluid pressure delivery chamber connected to the brake cylinder, d. a fluid pressure supply chamber to which the brake control pipe is connected, e. valve means having an operating stem connected to the larger of said abutments, said valve means being operable by one of said abutments, while said selective means provides one of said connections therebetween, to effect the supply of fluid under pressure from said supply chamber and control pipe of said delivery chamber and brake cylinder to establish therein one degree of fluid pressure in response to the supply of fluid under pressure to one of said chambers at one side of one of said abutments, and operable by said abutments, while said selective means provides the other of said connections therebetween, to effect the supply of fluid under pressure from said supply chamber and control pipe to said delivery chamber and brake cylinder to establish therein a different degree of fluid pressure in response to the supply of fluid under pressure to two of said chambers, each at one side of one of said abutments, f. stop means carried by the unsprung part of the vehicle, and g. load-sensing means including a lever having one end pivotally mounted on the sprung part of the vehicle and the other end rockable into abutting contact with said stop means, to provide, only while the vehicle is empty, a first position of said load-sensing means in which said selective means is rendered operable to provide said rigid connection between said abutments, and to provide, only while the vehicle is loaded, a second position of said load-sensing means in which said selective means is rendered operable to provide said lost-motion connection between said abutments.

10. A relay valve device, as recited in claim 9, further characterized in that said load-sensing means comprises a pair of valves and fluid pressure operable means for shifting said valves and said lever to different positions to control communication to one of said two chambers, one of said valves having a lost-motion connection with the other valve so as to be movable by and also relative to said other valve, said valves being shiftable in one direction by said fluid pressure operable means initially in unison from a first position to a second position only while the vehicle is loaded to maintain said communication closed, and shiftable in said one direction by said fluid pressure operable means initially in unison from a first position to a third position only while the vehicle is empty to open said communication, said one valve being shiftable relative to said other valve by fluid under pressure supplied through said open communication from one limit to the other of said lost-motion connection, whereby limited subsequent shifting of said valves in an opposite direction from said third position by said lever maintains said communication open.

11. A relay valve device, as recited in claim 9, further characterized in that said load-sensing means comprises:

a. casing means provided with a bore along which are spaced one end of each of a pair of passageways the opposite ends of which open respectively into said two chambers, b. a spool-type valve sealingly slidable in said bore and having a plurality of elongated peripheral annular grooves thereon, said valve being operably connected to said lever, c. an O-ring seal valve carried in one of said elongated grooves for movement by and relative to said spool-type valve within limits defined by contact with the ends of said one elongated groove, said O-ring seal valve being subject to pressure in one of said pair of passageways and movable thereby to one end or the other of said one elongated groove according to whether said spool valve is positioned by said lever in said first or in said second position, and d. fluid pressure operable means positively connected to said spool-type valve and subject opposingly to fluid under pressure in said one passageway and a spring-biasing means, said fluid pressure operable means being responsive to fluid under pressure supplied to said one passageway to shift said spool valve and thereby said O-ring seal valve in unison to said first or said second positions, said O-ring seal valve being carried to one side of said one end of said one passageway upon movement to said first position whereupon fluid under pressure from said one passageway maintains said O-ring seal valve at said one end of said one elongated groove, to close communication between said pair of passageways, and carried to the other side of said one end of said one passageway upon movement to said second position whereupon fluid under pressure from said one passageway shifts said O-ring seal valve from said one end of said one elongated groove to the opposite end of said groove for causing said spool valve and O-ring seal valve to maintain a communication between said pair of passageways notwithstanding a chosen degree of shifting of said spool valve and O-ring seal valve by said lever from said second position in the direction of said first position as the result of undesired rocking of said lever.

12. A relay valve device, as recited in claim 11, further characterized in that one end of a third passageway is spaced along said bore at the side of the one end of the other of said pair of passageways opposite the side of the end of said one passageway, and the opposite end of said third passageway is open to atmosphere, and said spool-type valve carries an immovable O-ring seal valve adjacent one end of another elongated peripheral annular groove which immovable O-ring seal valve, when said spool-type valve is moved to its said first position is disposed at that side of said one end of said third passageway opposite the side of the one end of the other of said pair of passageways, whereby this other of said pair of passageways is vented to atmosphere via said another elongated groove and said third passageway.

*13. Empty-load brake equipment for a railroad car comprising:*

*a. a fluid pressure operated control valve device having a delivery port and being operable to establish in said delivery port any chosen one of a plurality of pressures,*

*b. fluid motor means operable to cause a brake application on said railroad car to a degree corresponding in degree to the degree of the pressure of fluid supplied thereto,*

*c. a volume reservoir separate from and independent of siad fluid motor means,*

*d. relay valve means operable by fluid under pressure supplied from said delivery port to effect the supply of fluid under pressure from said delivery port to said fluid motor means, and*

*e. load-sensing means operable solely by the pressure in said delivery port and effective, while said railroad car is loaded, to cause said relay valve means to establish in only said fluid motor means the pressure in said delivery port, and effective, while said railroad car is empty, to connect said delivery port of said control valve device to said volume reservoir and to cause said relay valve means to operate to supply fluid under pressure from said delivery port to said fluid motor means, said load-sensing means and said relay valve means being thus cooperatively operable, while said railway car is empty, to cause the establishment in both said fluid motor means and said volume reservoir of pressures that are a proportional part of said delivery pressure.*

*14. Empty-load brake equipment for a railroad car comprising a fluid pressure operated control valve means having a delivery port and being operable to establish in said delivery port any chosen one of a plurality of degrees of fluid under pressure, fluid motor means operable by fluid under pressure to cause a brake application on the railroad car, a volume reservoir separate from and independent of said fluid motor means, relay valve means operable by fluid under pressure supplied from said delivery port to effect the supply of fluid under pressure from said delivery port to said fluid motor means, and change-over valve means shiftable solely by the pressure supplied from said delivery port to an empty position or a loaded position accordingly as the railroad car is either empty or fully loaded, said change-over valve means and said relay valve means being operative cojointly to cause, while said railroad car is empty, the establishment in said fluid motor means and in said volume reservoir pressures that are a proportional part of the degree of the pressure in said delivery port, and, while the railroad car is loaded, the establishment in only said fluid motor means the degree of pressure in said delivery port.*

*15. Empty-load brake equipment for a railroad car comprising:*

*a. a fluid pressure operated control valve device having a delivery port and being operable to establish in said delivery port any chosen one of a plurality of delivery pressures,*

*b. fluid motor means operable to cause a brake application on said railroad car to a degree corresponding in degree to the degree of the pressure of fluid supplied thereto,*

*c. a supply reservoir charged with fluid under pressure,*

*d. relay valve means operable by fluid under pressure supplied from said delivery port to effect the supply of fluid under pressure from said supply reservoir to said fluid motor means,*

*e. a volume reservoir separate from and independent of said fluid motor means, said reservoir being interposed between said delivery port and said relay valve means to provide a modified pressure for operating said relay valve means, and*

*f. load-sensing means operable solely by said modified pressure and effective, while said railroad car is loaded, to cause said relay valve means to establish in said fluid motor means a pressure corresponding in value to said modified pressure, and effective, while said railroad car is empty, to cause said relay valve means to operate to supply fluid under pressure from said supply reservoir to said fluid motor means, said load-sensing means being effective, while said railway car is empty, to so condition said relay valve means as to cause it to establish in said fluid motor means a pressure that is a proportional part of said modified pressure.*

* * * * *